United States Patent
Takeda et al.

(10) Patent No.: US 9,904,057 B2
(45) Date of Patent: Feb. 27, 2018

(54) LIGHT GUIDE DEVICE AND VIRTUAL IMAGE DISPLAY APPARATUS

(71) Applicant: SEIKO EPSON CORPORATION, Tokyo (JP)

(72) Inventors: Takashi Takeda, Suwa (JP); Takahiro Totani, Suwa (JP); Masayuki Takagi, Matsumoto (JP); Toshiaki Miyao, Matsumoto (JP); Akira Komatsu, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/179,365

(22) Filed: Jun. 10, 2016

(65) Prior Publication Data

US 2017/0059868 A1    Mar. 2, 2017

(30) Foreign Application Priority Data

Aug. 31, 2015  (JP) ................................ 2015-170160
Aug. 31, 2015  (JP) ................................ 2015-170161

(51) Int. Cl.
 *G02B 27/01*     (2006.01)
 *G02B 27/00*     (2006.01)
 (Continued)

(52) U.S. Cl.
 CPC ..... *G02B 27/0172* (2013.01); *G02B 27/0081* (2013.01); *G02B 27/4211* (2013.01);
 (Continued)

(58) Field of Classification Search
 CPC ............ G02B 27/0172; G02B 27/0081; G02B 27/4211; G02B 6/0026; G02B 6027/0116;
 (Continued)

(56) References Cited

U.S. PATENT DOCUMENTS 5,224,198 A * 6/1993 Jachimowicz ......... G02B 6/003
                                                    359/13
8,611,014 B2 * 12/2013 Valera ................ G02B 27/0081
                                                    359/630

(Continued)

FOREIGN PATENT DOCUMENTS

JP     2011-248318 A    12/2011
JP     2013-210633 A    10/2013

OTHER PUBLICATIONS

Cheng et al., "Design of an ultra-thin near-eye display with geometrical waveguide and freeform optics," Opt. Express 22, 20705-20719 (2014).*

(Continued)

*Primary Examiner* — Peter Radkowski
(74) *Attorney, Agent, or Firm* — Oliff PLC

(57) ABSTRACT

A light guide device may be incorporated into a virtual image display apparatus, and functionally includes a light-incident part for entrance of picture lights, a light guide part that guides the picture lights via the light-incident part, and a light-exiting part that outputs the picture lights from the light guide part to a position of an eye. In the light guide device, light guide that enables non-diffraction virtual image formation is performed with respect to lateral first directions and a pupil size is enlarged by first and second diffraction optical elements with respect to longitudinal second directions.

25 Claims, 19 Drawing Sheets

(51) Int. Cl.
*G02B 27/42* (2006.01)
*F21V 8/00* (2006.01)
(52) U.S. Cl.
CPC .... *G02B 6/0026* (2013.01); *G02B 2027/0116* (2013.01); *G02B 2027/0125* (2013.01); *G02B 2027/0145* (2013.01); *G02B 2027/0174* (2013.01)
(58) Field of Classification Search
CPC .... G02B 6027/0125; G02B 6027/0145; G02B 6027/0174
See application file for complete search history.

(56) References Cited

U.S. PATENT DOCUMENTS

| | | |
|---|---|---|
| 8,965,152 B2 | 2/2015 | Simmonds |
| 2016/0062113 A1* | 3/2016 | El-Ghoroury ...... G02B 27/0101 345/647 |

OTHER PUBLICATIONS

Han et al., "Portable waveguide display system with a large field of view by integrating freeform elements and volume holograms," Opt. Express 23, 3534-3549 (2015).*

* cited by examiner

LIGHT GUIDE DEVICE AND VIRTUAL IMAGE DISPLAY APPARATUS

BACKGROUND

1. Technical Field

The present invention relates to a light guide device used for a head mounted display worn on a head for use or the like and a virtual image display apparatus with the device incorporated therein.

2. Related Art

Recently, as virtual image display apparatuses that enable formation and observation of virtual images such as head mounted displays, various apparatuses that guide image lights from display devices by light guide plates to pupils of observers and enable observation of outside world images through the light guide plates have been proposed.

For example, a projection display apparatus including a first plate-like waveguide having a diffraction grating for output, a second plate-like waveguide having a pair of diffraction gratings for input and output, and an image supply light guide device that supplies image light to one end of the first plate-like waveguide is known (see Patent Document 1 (U.S. Pat. No. 8,965,152)). In the projection display apparatus, the collimated image light enters the first plate-like waveguide from the image supply light guide device and enlarges an exit pupil in horizontal directions within the waveguide, and the output from the first plate-like waveguide enters the second plate-like waveguide and enlarges an exit pupil in vertical directions within the waveguide. Further, in the projection display apparatus, three-layer channels for three colors are provided in the first plate-like waveguide and the second plate-like waveguide, and thereby, color representation can be performed.

According to the technique described in Patent Document 1, there is an advantage that the light guide plate may be made thinner. However, the diffraction gratings, i.e., the diffraction devices are used, and the peak of wavelength selectivity (diffraction efficiency with respect to wavelength) shifts depending on the angle of view of image light and color unevenness depending on the position within the screen is caused.

SUMMARY

An advantage of some aspects of the invention is to provide a light guide device with suppressed color unevenness and a virtual image display apparatus with the device incorporated therein.

A light guide device according to an aspect of the invention includes a light-incident part into which picture lights enter, a light guide part that guides the picture lights via the light-incident part, and a light-exiting part that outputs the picture lights from the light guide part to a position of an eye (specifically, a position in which the eye is to be located), wherein light guide that contributes to non-diffraction virtual image formation is performed with respect to first directions along a predetermined surface covering a front of the eye, and a pupil size is enlarged by a diffraction optical element with respect to second directions crossing the first directions along the predetermined surface.

According to the light guide device, the pupil size is enlarged by the diffraction optical element with respect to the second directions while the non-diffraction virtual image formation is contributed with respect to the first directions, and thereby, color unevenness may be further reduced and display with higher brightness can be performed than those in the case where an image is formed only by a diffraction optical element. Here, the diffraction optical element is not used with respect to the first directions, and thereby, production of streaky unevenness may be easily avoided. Regarding the first directions, the size increases with respect to the thickness of the optical element that contributes to the virtual image formation or the like, however, regarding the second directions, the size including the thickness of the optical element may be suppressed to be smaller, and thereby, the light guide device may be made thinner and smaller. Further, regarding the first directions, the diffraction optical element is not used and the enlargement of the pupil size is not necessarily easy, however, regarding the second directions, the pupil size may be reliably enlarged by the diffraction optical element.

Regarding the first directions, for example, an optical system that geometrically and optically forms a virtual image may be used or an optical system that geometrically and optically enlarges the pupil size may be used. In another view point, first, a virtual image may be formed by continuous beam processing (refraction, reflection, or the like) without division of beams. Second, the pupil size may be enlarged by discontinuous beam processing (refraction, reflection, or the like) with division of beams.

BRIEF DESCRIPTION OF THE DRAWINGS

The invention will be described with reference to the accompanying drawings, wherein like numbers reference like elements.

FIG. 4A is a partially enlarged view around a first hologram element and FIG. 4B is a diagram for explanation of functions of the first hologram element and a second hologram element.

DESCRIPTION OF EXEMPLARY EMBODIMENTS

First Embodiment

As below, a virtual image display apparatus with a light guide device according to the first embodiment of the invention incorporated therein will be explained.

Figure 1A:
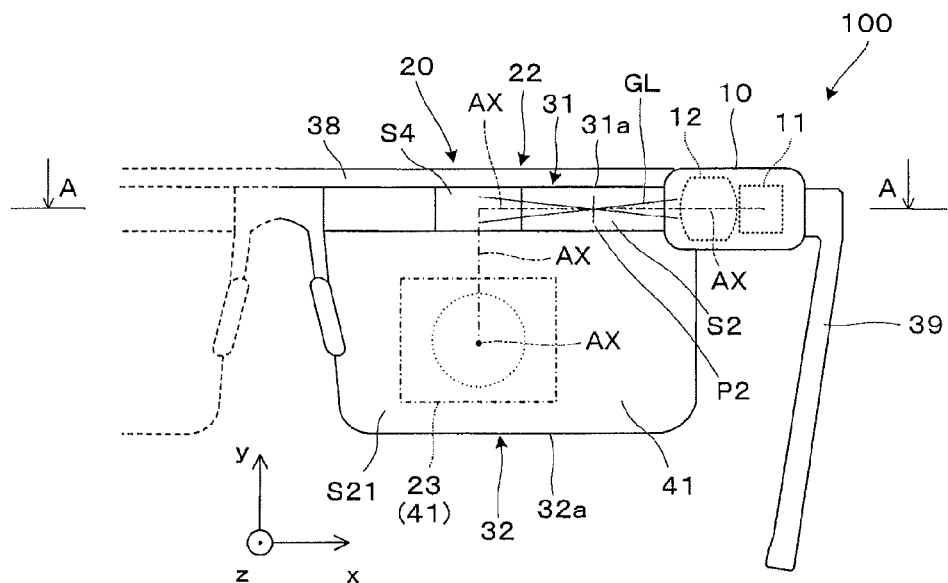
FIG. 1A is a rear view showing a virtual image display apparatus according to the first embodiment.
Figure 1B:
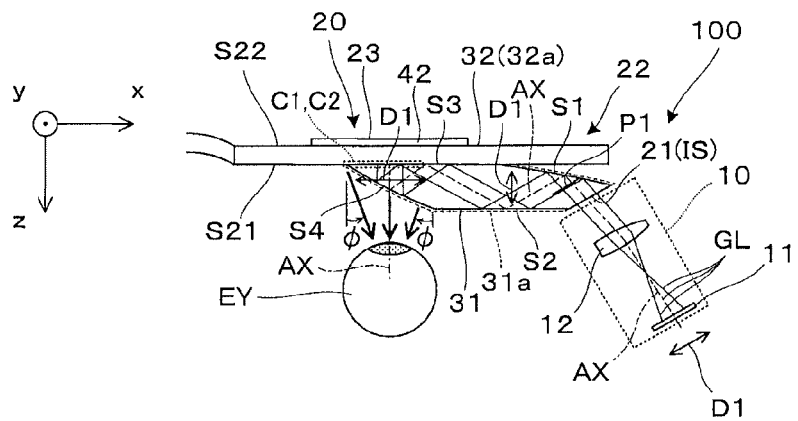
FIG. 1B is a sectional view for conceptual explanation of one side of the virtual image display apparatus.
Figure 1C:
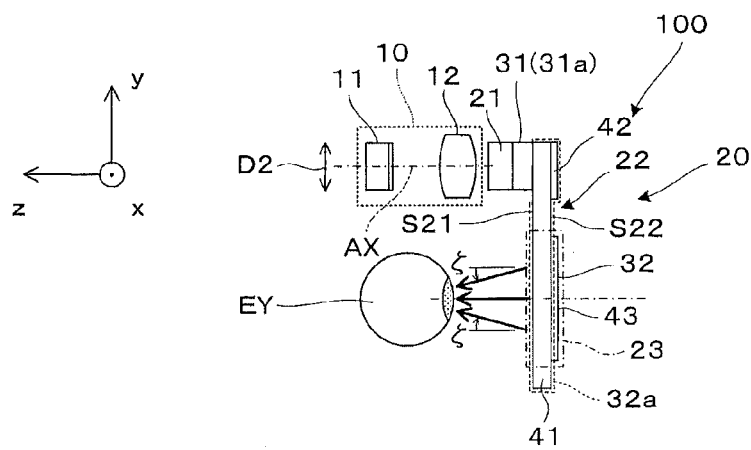
FIG. 1C is a side view for conceptual explanation of the one side of the virtual image display apparatus.

A virtual image display apparatus 100 shown in FIGS. 1A to 1C is applied to a head mounted display and includes an image forming device 10 and a light guide device 20 as a pair. Note that FIG. 1B corresponds to a section along A-A of the virtual image display apparatus 100 shown in FIG. 1A.

The virtual image display apparatus 100 allows an observer to recognize a color picture as a virtual image and observe an outside world image in see-through vision. In the virtual image display apparatus 100, the pair of the image forming device 10 and the light guide device 20 are generally provided for each of the right eye and the left eye of the observer, and the devices for right eye and left eye are symmetric and only the devices for right eye are shown here and the illustration of the devices for left eye are omitted.

The virtual image display apparatus 100 has an appearance (not shown) like typical spectacles as a whole, for example, and includes a rim part 38 and temple parts 39 that support the image forming device 10 and the light guide device 20.

The image forming device 10 includes a liquid crystal device 11 as a picture device and a projection lens 12 for optical coupling. The liquid crystal device (picture device) 11 spatially modulates illumination light from a light source (not shown) and forms picture lights GL to be displayed as a moving image or the like. The projection lens 12 is a lens that once collects the picture lights GL output from the respective points on the liquid crystal device 11. Note that the projection lens 12 is formed using glass or plastic and includes not only a single lens but also a plurality of lenses. The projection lens 12 is not limited to a spherical lens, but may be an aspherical lens, a free-form surface lens having a non-axisymmetric surface, or the like.

The light guide device 20 outputs the picture lights GL formed by the image forming device 10 toward an eye EY of the observer as virtual lights and transmits outside world light OL corresponding to an outside world image substantially without change. The light guide device 20 structurally includes a first light guide member 31 as a non-diffraction optical member that forms a virtual image with respect to the horizontal directions at wearing or lateral directions in which eyes EY are arranged as first directions and a second light guide member 32 as a diffraction optical member that forms a virtual image with respect to longitudinal directions as second directions crossing orthogonally to the first directions. In the case of the embodiment, the first light guide member (first optical member) 31 is provided in an upward position of the eye EY of the observer in a front direction of the eyebrow, and the second light guide member (second optical member) 32 is provided in a front direction of the eye EY to cover the eye EY. Here, the first light guide member 31 is provided inside at the side of the eye EY with respect to the second light guide member 32. The first light guide member 31 and the second light guide member 32 are fixed to each other or indirectly fixed via the rim part 38 or the like. In this case, the first light guide member 31 (or a first portion 31a, which will be described later) on the light-incident side is provided on the upside, and thereby, the liquid crystal device 11 etc. that supply picture lights to the first light guide member 31 may be provided in a space above the corner of the eye with secured clearance. Further, in the appearance, the first light guide member 31 acts like a frame and the second light guide member 32 acts like a spectacle lens, and the spectacle appearance is easily achieved as the light guide device 20.

The light guide device 20 functionally includes a light-incident part 21 that takes in picture lights, a light guide part 22 for light guide and image formation, and a light-exiting part 23 for taking out picture lights. The incident part 21 is provided in the front direction of the end of the eyebrow of the observer in the first light guide member 31, and the light-exiting part 23 is provided in the front direction of the eye EY to cover the eye EY in the second light guide member 32.

Note that the first light guide member 31 includes the light-incident part 21 and the first portion 31a, and the light-incident part 21 and the first portion 31a are partially in common. Further, the second light guide member 32 includes a second portion 32a and the light-exiting part 23, and the second portion 32a and the light-exiting part 23 are partially in common. The first portion 31a of the first light guide member 31 and the second portion 32a of the second light guide member 32 form the light guide part 22 extending between the light-incident part 21 and the light-exiting part 23. Here, the first portion 31a is provided above the eye EY and the second portion 32a is provided in front of the eye EY to cover the eye EY. Further, the first portion 31a is provided at the side of the eye EY with respect to the second portion 32a. That is, the first portion 31a on the light-incident side is inconspicuously provided behind the second portion 32a on the light-exiting side.

In the case of the above described light guide device 20, in the first light guide member 31 or the first portion 31a, a virtual image is geometrically and optically formed with respect to the lateral first directions by the light-incident part 21 or the first portion 31a, and a virtual image using diffraction is formed with respect to the longitudinal second directions by the second light guide member 32, i.e., the second portion 32a and the light-exiting part 23.

Figure 2A:
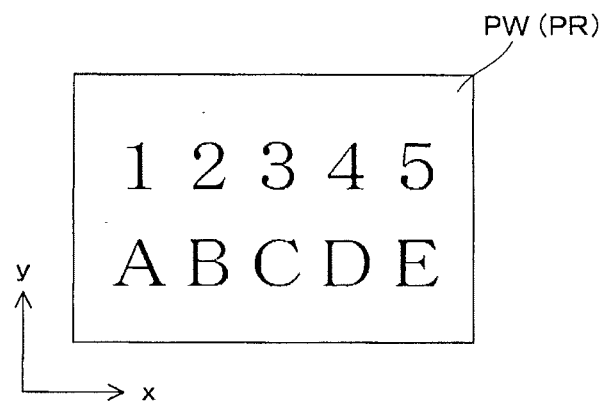
FIG. 2A is a diagram for explanation of an example of a screen of a virtual image.
Figure 2B:
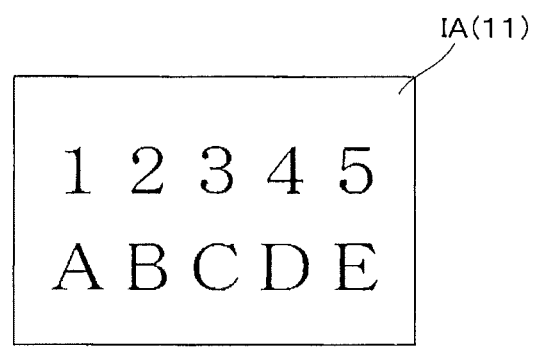
FIGS. 2B and 2C are diagrams for explanation of examples of display areas of a liquid crystal device.
Figure 2C:
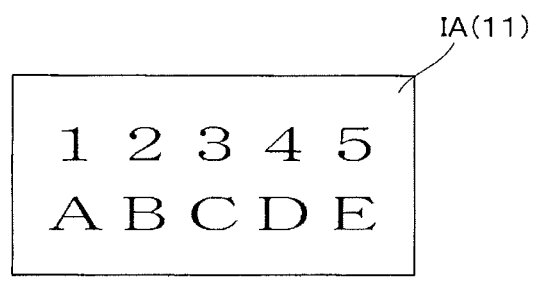

Here, as shown in FIG. 2A, a size of a screen PW of the virtual image observed by the observer (i.e., a projection range PR) with respect to the first directions (specifically, the x directions) is larger than a size of the screen PW in the second directions (specifically, the y directions). Thereby, though the reason will be described later, color unevenness of the screen PW may be reduced with respect to the first directions in which the size is larger and the color unevenness may be made inconspicuous as the whole screen PW. Note that the virtual image formed by the lateral light-incident part 21 and first portion 31a and the virtual image formed by the longitudinal second portion 32a and light-exiting part 23 may be different in imaging scaling factor. That is, as shown in FIG. 2B, a display area IA of the liquid crystal device 11 may be made equal to an aspect ratio of the screen PW of the virtual image shown in FIG. 2A, however, as shown in FIG. 2C, the display area IA of the liquid crystal device 11 may be made different (laterally longer, for example) from the aspect ratio of the screen PW of the virtual image shown in FIG. 2A.

Returning to FIG. 1B etc., the main body of the first light guide member 31 is an integrated part molded using a resin material having high light transmissivity. The first light guide member 31 has a light-incident surface IS as the light-incident part 21, a first surface S1 having positive power or refractive power within the xz plane corresponding to the lateral directions, a second surface S2 as a flat surface without power, a third surface S3 as a flat surface without power, and a fourth surface S4 as an inclined surface having positive power within the xz plane corresponding to the lateral directions. As described above, the first light guide member 31 is an optical member having the surfaces S1, S4 curved to be concave or convex with respect to the first directions and having power with respect to the first directions. That is, the first light guide member 31 has an effect of relatively diffusing or converging the picture lights after passing of the curved surfaces. Thereby, the spread of the picture lights GL during light guide may be made smaller with respect to the geometrical-optical virtual image formation and the first portion 31a of the light guide part 22 and thus the light guide device 20 may be downsized. The first surface S1 and the fourth surface S4 are non-transmissive mirrors having surfaces as curved surfaces with metal films or the like formed thereon. The second surface S2 and the third surface S3 are exposure of surfaces as flat surfaces and total reflection surfaces that reflect the picture lights GL having predetermined or larger incident angles, and do not particularly contribute to imaging. Of them, particularly, a part of the third surface S3 serves as a first coupling part C1 that outputs the picture lights GL through the first light guide member 31 or the first portion 31a, i.e., the picture lights GL reflected by the fourth surface S4 toward the second light guide member 32 or second portion 32a side.

Note that the second and third surfaces S2, S3 are not limited to the exposure of the resin molded part of the main body of the first portion 31a, but may be a coated resin molded part of the main body with a hard coating layer.

The picture lights GL introduced into the first light guide member 31 via the light-incident part 21 are further converged by the first surface S1 with respect to the xz plane, and once form an intermediate image in an imaging position P1 within the first light guide member 31. Then, the picture lights GL through the second and third surfaces S2, S3 are reflected by the fourth surface S4 as the inclined surface into parallel light while the light guide direction is largely changed, and enters the first coupling part C1 of the third surface S3 at an angle closer to the right angle. The picture lights GL passing through the first coupling part C1 of the third surface S3 enter the second light guide member 32, which will be described later in detail. As described above, the picture lights GL are reflected by the fourth surface S4 as the inclined surface with respect to the first directions (specifically, the x directions) and output to the second portion 32a, and thereby, the output of the picture lights GL from the light guide part 22 toward the light-exiting part 23 becomes reliable and coupling efficiency to the light-exiting part 23 may be improved. Though the details will be described later, the first light guide member 31 functions as a collimator with respect to the lateral first directions (within the xz plane) and has a role of securing a certain or larger pupil size. When the first light guide member 31 provides different imaging scaling factors between within the xz plane and in the y directions, an imaging position P2 with respect to y directions is different from the imaging position P1 within the xz plane.

Note that, in the embodiment, the first light guide member 31 also functions as a collimator with respect to the longitudinal second directions (or the y directions), however, the longitudinal pupil size is significantly smaller than the lateral pupil size because the longitudinal width of the first light guide member 31 is small.

Figure 3:
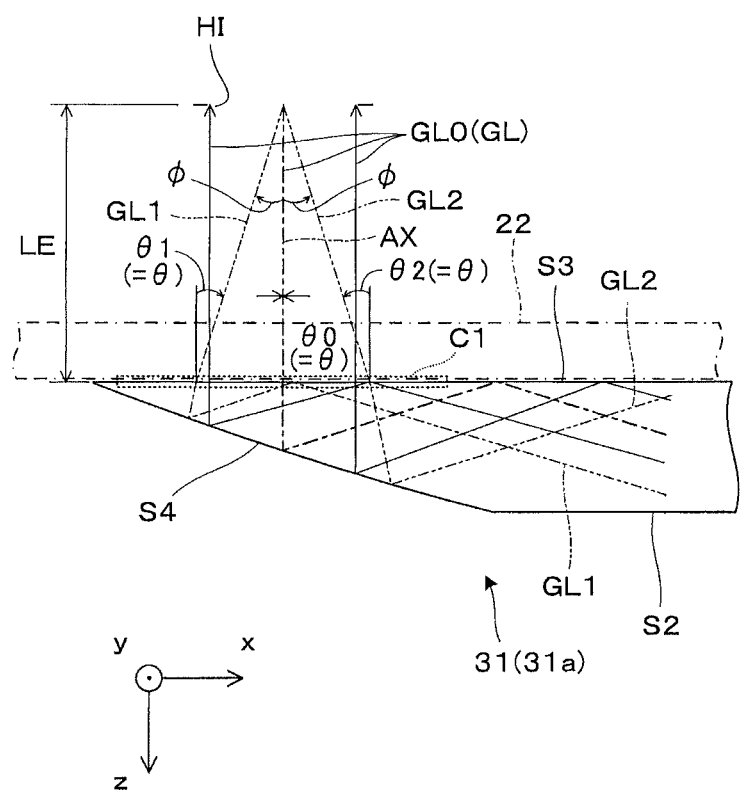
FIG. 3 is a diagram for explanation of imaging by a first light guide member or a first portion.

FIG. 3 is a diagram for explanation of the picture lights GL output from the first light guide member 31. Note that, in the drawing, for convenience of explanation, the action of the second light guide member 32 is excluded and the picture lights GL are output from the first light guide member 31 and travel straight toward the opposite side to the proper eye.

Of the picture lights GL passing through the first coupling part C1 of the first light guide member 31 and entering the second light guide member 32, the picture lights GL output from the respective points of the display area IA (see FIG. 2A) of the liquid crystal device 11 of the image forming device 10 shown in FIG. 1B are output from the first light guide member 31 in parallel beams. In this regard, in the lateral directions in which the eyes EY are arranged or within the xz plane corresponding to the horizontal directions at wearing, angles θ of the picture lights GL output from the first coupling part C1 with respect to the first coupling part C1 or the third surface S3 reflect lateral directions D1 on the display area IA (see FIG. 1B). That is, a position on the display area IA in the lateral directions D1 corresponds to an incident angle φ within the xz plane with respect to the optical axis AX of the picture lights GL entering an equivalent position of the eye EY (i.e., the pupil HI for observation), and a virtual image is formed with respect to the lateral directions. Specifically, the picture light GL0 from the center of the liquid crystal device 11 shown in FIG. 1B is output from the first light guide member 31 (specifically, the second light guide member 32) in parallel to the optical axis AX at an angle θ0=0. Further, the picture light GL1 from a position of the liquid crystal device 11 on the right side (on the +x side) in the drawing is output from the first light guide member 31 at an angle θ1 with respect to the optical axis AX. The picture light GL2 from a position of the liquid crystal device 11 on the left side (on the −x side) in the drawing is output from the first light guide member 31 at an angle θ2 with respect to the optical axis AX. That is, the first light guide member 31 forms a virtual image with respect to the lateral directions in which the eyes EY are arranged as first directions. In this regard, a distance LE from the first coupling part C1 to the pupil HI is set so that principal rays of the picture lights GL output from the first coupling part C1 may cross in consideration of a standard light guide distance or optical path length of the picture lights GL in the second light guide member 32. That is, the sufficient pupil size is secured with respect to the lateral directions and the picture lights GL are efficiently taken into the eye EY. When the sufficient pupil size is secured in the lateral directions in the above described manner, the field of view is easily widened and color unevenness is preferably inconspicuous on both ends of the screen, and the significance of employment of the non-diffraction first light guide member 31 increases.

Returning to FIGS. 1A to 1C, the second light guide member 32 is provided orthogonally to the optical axis AX on the light-exiting side or the x-axis in consideration of ease of optical design and extends in parallel to the xy plane. Here, the optical axis AX on the light-exiting side corresponds to the front direction of the face of the observer when the virtual image display apparatus 100 or the light guide device 20 is worn, and is parallel to the axis of symmetry passing through the center of the rim part 38. The second light guide member 32 has a light guide plate 41 that forms the entire appearance, a first hologram element 42 corresponding to a diffraction optical element provided on the light-incident side of the light guide plate 41 and sending the picture lights GL to the light-existing side, and a second hologram element 43 corresponding to a diffraction optical element provided on the light-exiting side of the light guide plate 41 and sending the picture lights GL to the eye EY side. The second light guide member 32 may be formed in a thickness of about 2 mm.

The light guide plate 41 is an optical element without an action corresponding to power or refractive power and provided in front of the eye EY to cover the eye EY. The light guide plate 41 is a parallel plate molded using a resin material having high light transmissivity. The light guide plate 41 forms the second portion 32a of the light guide device 20 in cooperation with the first hologram element 42. The light guide plate 41 has a first surface S21 provided inside at the side of the eye EY and a second surface S22 provided outside opposite to the eye EY, and the first and second surfaces S21, S22 are parallel to each other. The first and second surfaces S21, S22 are exposure of surfaces as flat surfaces and total reflection surfaces that reflect the picture lights GL having predetermined or larger incident angles, and do not particularly contribute to imaging. The picture lights GL entering the light guide plate 41 from the first light guide member 31 are propagated downward, i.e., in the −y direction as a whole through the first hologram element 42. In this regard, the picture lights GL are propagated while totally reflected between the first and second surfaces S21, S22 in parallel to each other, and thereby, angle information is maintained and parallel beams are propagated as parallel beams.

Figure 4A:
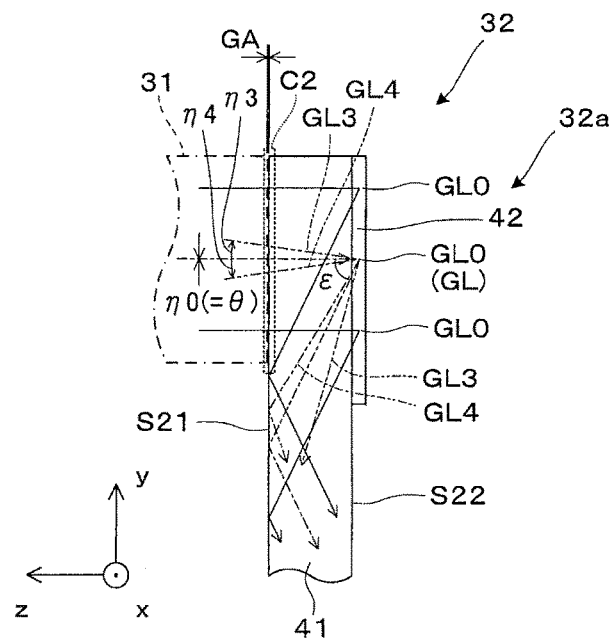
FIGS. 4A and 4B are diagrams for explanation of imaging by a second light guide member, and specifically.

Note that an upper part of the first surface S21 of the light guide plate 41 serves as a second coupling part C2 that allows the picture lights GL output from the first coupling part C1 of the first light guide member 31 into the second light guide member 32 side (see FIG. 4A). The first coupling part C1 and the second coupling part C2 are not completely in contact, but close to each other. It is desirable that a gap GA between the third surface S3 of the first coupling part C1 and the first surface S21 of the second coupling part C2 is secured to an extent at which interference fringes are not generated, i.e., one micrometer or several micrometers or more.

The first hologram element 42 is an optical element without an action corresponding to power or refractive power. The first hologram element 42 is a thin-film or thin-plate member and fixed to be bonded to the second surface S22 of the light guide plate 41. The first hologram element 42 is used for taking in the picture lights GL. The first hologram element 42 is a reflective volume hologram in which a three-dimensional interference pattern is formed and may function as an optical element that forms a color image, and thereby, virtual image formation with higher brightness and higher accuracy may be performed. The first hologram element 42 may be manufactured by a method described in JP-A-2011-248318 or the like, for example. Note that the first hologram element 42 and the light guide plate 41 are closely adhered to each other without a gap or bonded to each other.

The second hologram element 43 is an optical element without an action corresponding to power or refractive power. The second hologram element 43 is a thin-film or thin-plate member and fixed to be bonded to the second surface S22 of the light guide plate 41. The second hologram element 43 is used for taking out the picture lights GL. The second hologram element 43 is a reflective volume hologram in which a three-dimensional interference pattern is formed like the first hologram element 42 and may function as an optical element. Note that the second hologram element 43 and the light guide plate 41 are closely adhered to each other without a gap or bonded to each other.

Figure 4B:
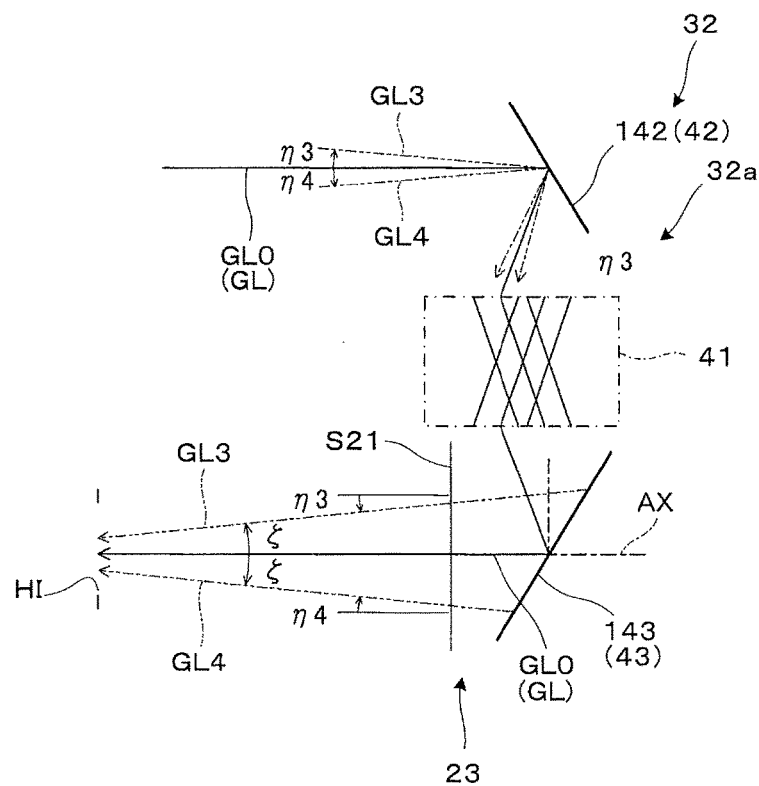

FIG. 4A is a partially enlarged view around the first hologram element 42 and FIG. 4B is a diagram for explanation of functions of the first hologram element 42 and the second hologram element 43.

The first hologram element 42 functions as a tilted mirror 142 within the yz plane corresponding to the longitudinal directions. The picture lights GL entering the first hologram element 42 from the first light guide member 31 through the light guide plate 41 are reflected at exit angles ϵ set to angles appropriate for light guide within the light guide plate 41 and returned into the light guide plate 41 by the function of the tilted mirror 142. In this regard, angles $\eta$ ($\eta 0$, $\eta 3$, $\eta 4$) of the picture lights GL output from the first light guide member 31 with respect to the second coupling part C2 or the first surface S21 reflect longitudinal directions D2 on the display area IA provided in the liquid crystal device 11 (see FIG. 1C), and the relative angle relationships are maintained even through the first hologram element 42. Note that, as above, for simplification of explanation, refraction of beams in the first surface S21 or the second coupling part C2 is ignored. Even when the refraction of beams is considered, the maintenance of the relative angle relationships of the picture lights GL is not affected.

The light guide plate 41 has a role of effectively widening the width of a pencil of rays, i.e., the incident pupil width with respect to the second directions, i.e., the longitudinal directions orthogonal to the lateral directions in which the eyes EY are arranged in cooperation of the second hologram element 43 while maintaining the angles of the traveling directions of the picture lights GL.

The second hologram element 43 functions as a tilted mirror 143 within the yz plane corresponding to the longitudinal directions. The picture lights GL entering the second hologram element 43 from the first hologram element 42 through the light guide plate 41 are reflected at angles appropriate for exit from the light guide plate 41 and taken out of the light guide plate 41 by the function of the tilted mirror 143 of the second hologram element 43. In this regard, the second hologram element 43 maintains the relative angle relationships among beams forming the picture lights GL, and angles η (η0, η1, η2) of the picture lights GL output from the second light guide member 32 with respect to the first surface S21 reflect the longitudinal directions D2 (see FIG. 1C) on the display area IA provided in the liquid crystal device 11 shown in FIG. 1C. That is, a position in the longitudinal directions D2 on the display area IA corresponds to incident angles ζ of the picture lights GL entering the pupil HI in the y directions with respect to the optical axis AX, and a virtual image is formed with respect to the longitudinal directions. Specifically, the picture light GL0 from the center of the liquid crystal device 11 shown in FIG. 1C is output from the second light guide member 32 in parallel to the optical axis AX at an angle η0=0. Further, the picture lights GL3, GL4 from upward and downward positions of the liquid crystal device 11 (on the +y side or the −y side) are output from the second light guide member 32 at angles η3, η4 with respect to the optical axis AX. That is, the second light guide member 32 forms a virtual image with respect to the longitudinal directions orthogonal to the arrangement of the eyes EY as second directions.

Note that the second hologram element 43 has symmetry with the first hologram element 42 and has a relationship of cancelling out wavelength dependence of angles at which the picture lights GL are taken out.

Figure 5:
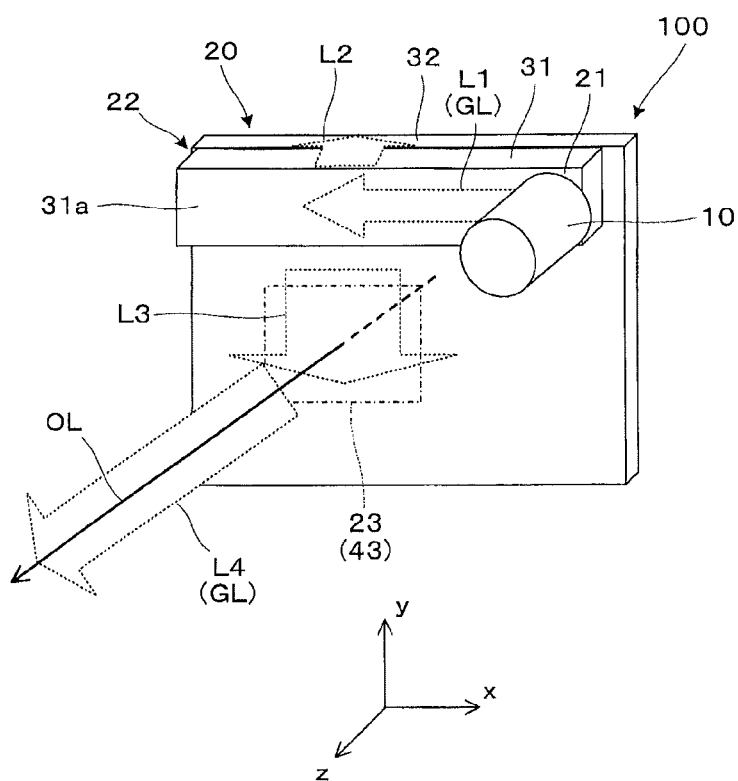
FIG. 5 is a perspective view for conceptual explanation of an operation of the virtual image display apparatus.

FIG. 5 is a diagram for conceptual explanation of an operation of the virtual image display apparatus 100. The picture lights GL formed by the image forming device 10 first enter the light-incident part 21 and are guided to the first portion 31a of the first light guide member 31 having the first surface S1, and the fourth surface S4, etc. and formed into a virtual image with respect to the lateral directions as the first directions corresponding to the arrangement of the eyes EY (see light L1). The directions of the picture lights GL are changed to the orthogonal forward −z direction, and the lights enter the second light guide member 32 (see light L2). The picture lights GL entering the second light guide member 32 having the hologram elements 42, 43 propagate in the longitudinal directions as the second directions orthogonal to the arrangement of the eyes EY (specifically, −y direction), and the pupil size is enlarged with respect to the longitudinal directions (see light L3). The picture lights GL reaching the light-exiting part 23 of the second light guide member 32 are output to the z side at the side of the eye EY (see light L4). In this regard, the picture lights GL shown by the light L4 form a virtual image having angles of view sufficient with respect to the lateral directions and the longitudinal directions, and the observer can observe the image formed on the liquid crystal device 11.

Note that the light-exiting part 23 is a part in which the second hologram element 43 exists and can transmit outside world light OL depending on the diffraction efficiency of the second hologram element 43. Further, the light guide plate 41 that supports the second hologram element 43 can transmit outside world light OL, and consequently, the observer can observe the outside world through the second light guide member 32.

Figure 6:
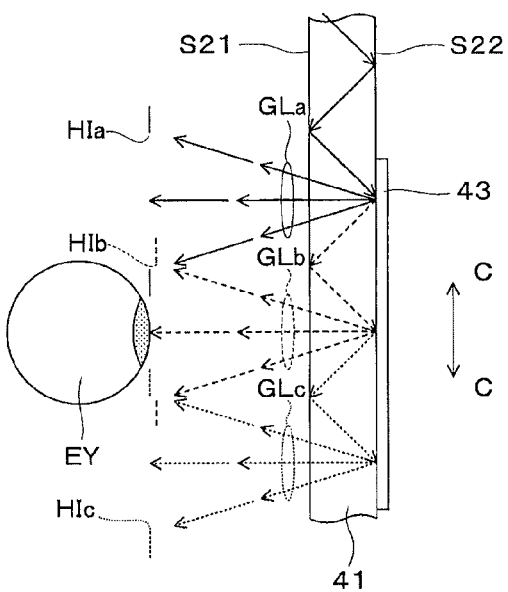
FIG. 6 is a diagram for conceptual explanation of enlargement of a pupil size by the second light guide member.

FIG. 6 is a diagram for conceptual explanation of enlargement of the pupil size by the second light guide member 32. In the second light guide member 32, an action of outputting part of picture lights in the respective portions of the second hologram element 43 toward the eye EY while guiding the rest using the light guide plate 41 is produced, and enlargement of the pupil size in the longitudinal directions is achieved. Specifically, for example, the image light GLa guided by the light guide plate 41 and first diffracted by the second hologram element 43 enters a pupil (or eye ring) HIa for exit observation set in a position higher than the position of the eye EY. Further, the image light GLb guided by the light guide plate 41, colliding with the second hologram element 43, first not diffracted, but totally reflected by the first surface S21 of the light guide plate 41, once entering the second hologram element 43 again, and diffracted enters a pupil (or eye ring) HIb for exit observation set nearly in the position of the eye EY. Furthermore, the image light GLc guided by the light guide plate 41, entering the second hologram element 43 twice, but not diffracted, totally reflected by the first surface S21 of the light guide plate 41, entering the second hologram element 43 again, and diffracted enters a pupil (or eye ring) HIc for exit observation set in a position lower than the position of the eye EY. That is, the pupils HIa to HIc are aligned with respect to longitudinal second directions CC, and thereby, enlargement of the effective pupil size is achieved.

According to the above described light guide device 20 of the first embodiment, non-diffraction virtual image formation is contributed with respect to the lateral first directions and the virtual image is formed to enlarge the width of the exit pupil (pupil size) by the first and second hologram elements (diffraction optical elements) 42, 43 with respect to the longitudinal second directions, and thereby, color unevenness may be further reduced and display with higher brightness can be performed than those in the case where an image is formed only by a diffraction optical element such as a hologram element. Further, the first and second hologram elements 42, 43 are not used with respect to the lateral first directions, and thereby, production of streaky unevenness may be easily avoided. Note that, in the light guide device 20 of the embodiment, the first light guide member 31 may be regarded as a relay system that does not enlarge the width of the exit pupil (pupil size) with respect to the lateral first directions and the longitudinal second directions, and the second light guide member 32 may be interpret to enlarge the exit pupil (pupil size) with respect to the longitudinal directions without influence on the lateral directions.

Further, in the light guide device 20, the second light guide member 32 (the second portion 32a and the light-exiting part 23) forms a virtual image using diffraction with respect to the longitudinal second directions, i.e., a virtual image using diffraction on the light-exiting side, and thereby, the parts of the light guide device 20 on the light-exiting side including the light-exiting part 23 and the second portion 32a provided in front of the eye may be made thinner and a smart appearance may be easily achieved.

As below, the reason that the first light guide member 31 geometrically and optically forms a virtual image with respect to the lateral directions as the first directions and the second light guide member 32 forms a virtual image using diffraction or interference with respect to the longitudinal directions as the second directions will be explained.

Figure 7A:
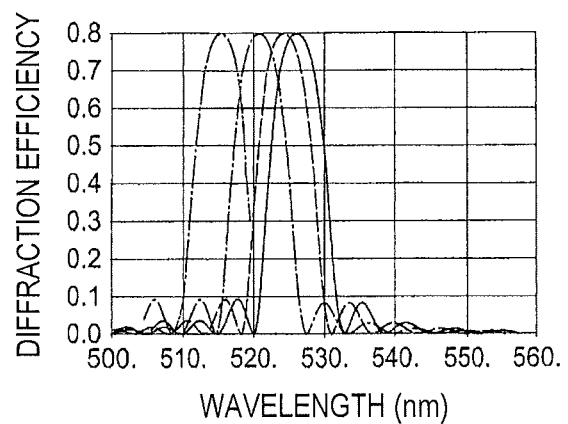
FIGS. 7A to 7C are diagrams for explanation of production and suppression of color unevenness.
Figure 7B:
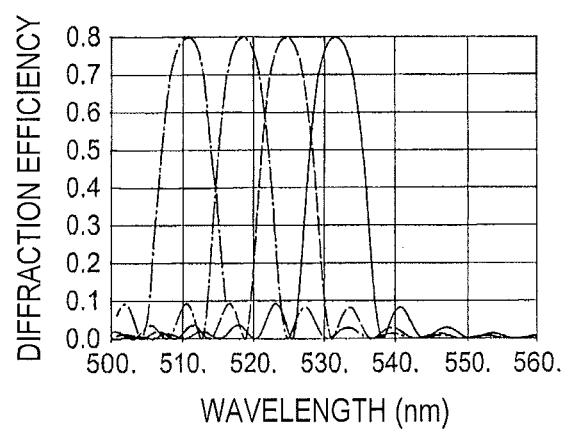

FIG. 7A shows relationships between the wavelength and the diffraction efficiency around green with respect to image formation in the longitudinal directions by the second light guide member 32 regarding a specific practical example. Further, FIG. 7B shows relationships between the wavelength and the diffraction efficiency around green with respect to image formation in a comparative example. In the respective charts, the lateral axis indicates the wavelength and the longitudinal axis indicates the diffraction efficiency. Here, the projection screen by the light guide device 20 is at longitudinal:lateral=9:16 and the lateral length is 1.8 times the longitudinal length. The practical example in FIG. 7A shows the case where a virtual image is formed using the hologram elements with respect to relatively short longitudinal directions by the second light guide member 32, and the comparative example in FIG. 7B shows the case where a virtual image is formed in a size corresponding to relatively long lateral directions by the same member as the second light guide member 32. In the respective charts, a plurality of characteristic curves show characteristics at a plurality points (including both ends) in the longitudinal directions on the screen, and, the larger the variation range of the peak wavelengths of the characteristic curves, the more likely color representation is varied with respect to the image formation in the longitudinal directions by the second light guide member 32.

In the case of the practical example with the smaller image formation range as shown in FIG. 7A, the variation range of the peak wavelengths as a whole is relatively as small as about 8 nm. On the other hand, in the case of the comparative example with the larger image formation range as shown in FIG. 7B, the variation range of the peak wavelengths as a whole is relatively as large as 20 nm or more. That is, it is known that, when the projection screen is laterally longer, formation of a virtual image using diffraction with respect to the longitudinal directions as the second directions (the directions in which the screen is relatively small) by the second light guide member 32 is more preferable in view of suppression of color unevenness than the formation of a virtual image using diffraction with respect to the lateral directions as the first directions.

Figure 7C:
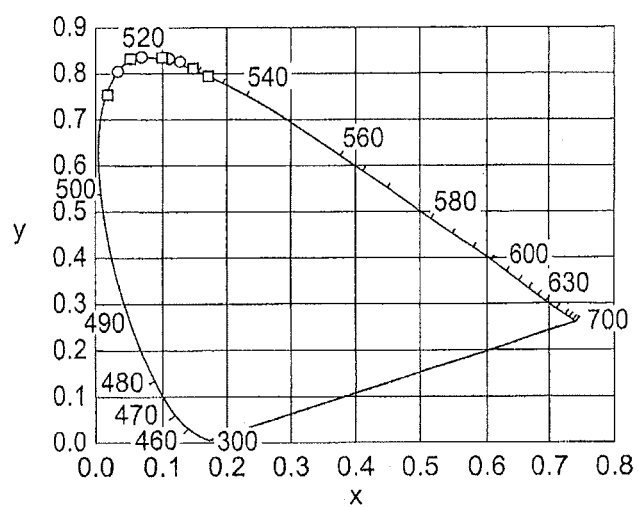

Note that FIG. 7C is a chromaticity diagram. The points shown by circles in FIG. 7C correspond to the case of the practical example shown in FIG. 7A and show green variations by the hologram elements in the relatively small sizes in the enlargement directions of the pupil size (specifically, the longitudinal directions), and the points shown by squares in FIG. 7C correspond to the case of the comparative example shown in FIG. 7B and show green variations by the hologram elements in the relatively large sizes in the enlargement directions of the pupil size (specifically, the longitudinal directions). As clearly seen from the diagram, the green variations in the practical example are significantly smaller than the green variations in the comparative example, and changes of color gamut shown by a triangle may be reduced. That is, in the case of the practical example, it is unnecessary to largely adjust the color balance for preventing color unevenness in the projection screen and the reproduction range of colors may be widely secured.

Figure 8A:
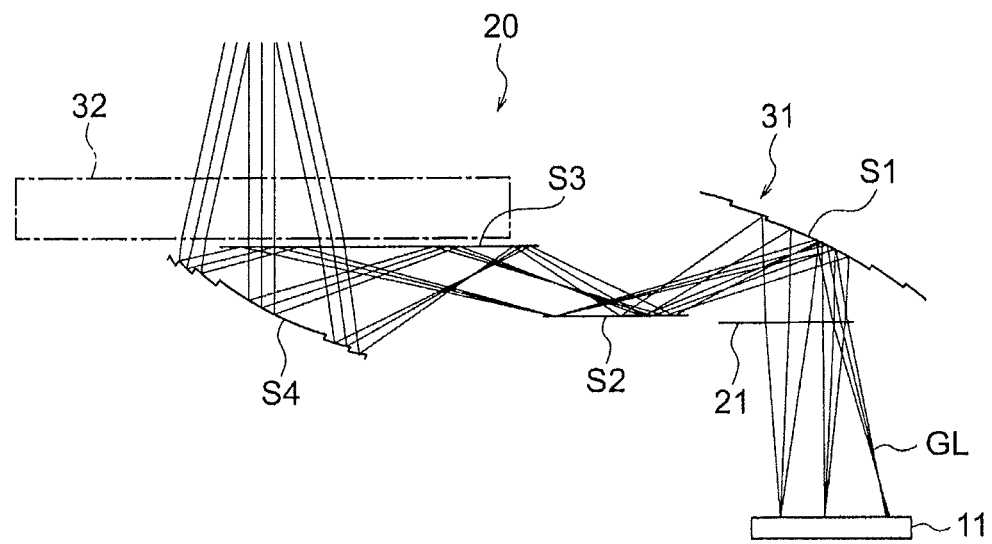
FIGS. 8A and 8B are a plan sectional view and a partially enlarged sectional view for explanation of a modified example in which a Fresnel mirror is incorporated in the first light guide member for geometrical-optical virtual image formation.
Figure 8B:
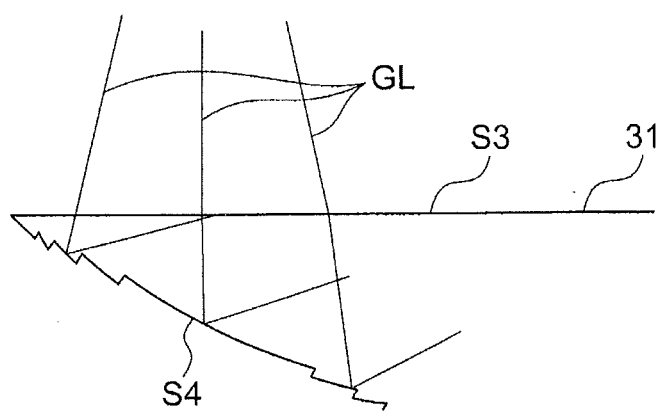

FIGS. 8A and 8B show a modified example of the first light guide member 31 shown in FIG. 3 etc. In the first light guide member 31 shown in FIG. 8A, for example, the fourth surface S4 is a Fresnel mirror or Fresnel lens as enlarged and shown in FIG. 8B. Further, the first surface S1 may be a Fresnel mirror. The fourth surface S4 has positive power or refractive power at least within the xz plane corresponding to the lateral directions like that in the case shown in FIG. 3, and is entirely not contoured, but flat because of being the Fresnel mirror. Similarly, the first surface S1 has positive power or refractive power at least within the xz plane corresponding to the lateral directions, and is entirely not contoured, but flat because of being the Fresnel mirror.

Second Embodiment

As below, a virtual image display apparatus with a light guide device according to the second embodiment of the invention incorporated therein will be explained. Note that the light guide device according to the second embodiment is obtained by partially changing the light guide device according to the first embodiment and the explanation of the parts in common will be omitted.

Figure 9:
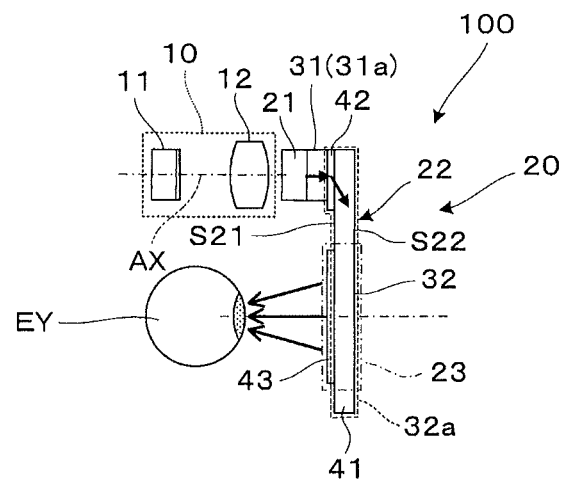
FIG. 9 is a side view for explanation of a light guide device according to the second embodiment.

As shown in FIG. 9, the light guide device 20 of the embodiment uses not reflective, but transmissive volume holograms as the first hologram element 42 and the second hologram element 43. In this case, the first hologram element 42 is provided between the first light guide member 31 and the light guide plate 41. The first hologram element 42 changes the traveling directions of the picture lights GL passing through the element to traveling directions at angles at which the lights are propagated while being totally reflected within the light guide plate 41. The second hologram element 43 is attached onto the first surface S21 on the eye EY side of the light guide plate 41. The second hologram element 43 allows the picture lights GL propagated by total reflection within the light guide plate 41 to pass through to the outside of the light guide plate 41 and send out the lights toward the eye EY.

Third Embodiment

As below, a virtual image display apparatus with a light guide device according to the third embodiment of the invention incorporated therein will be explained. Note that the light guide device according to the third embodiment is obtained by partially changing the light guide device according to the first embodiment and the explanation of the parts in common will be omitted.

Figure 10:
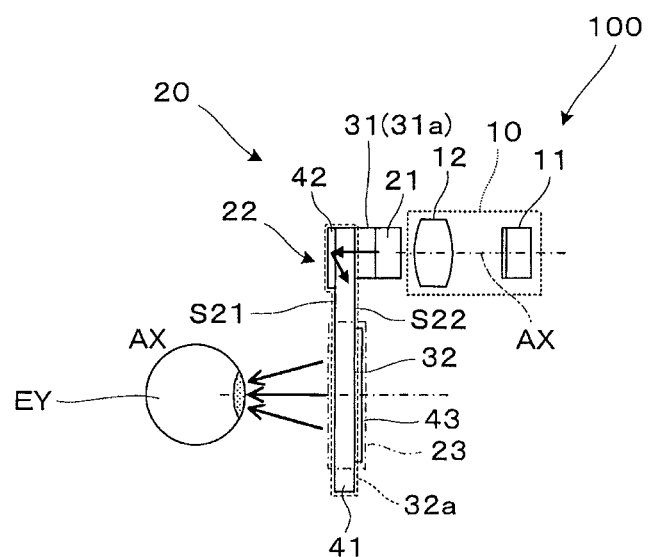
FIG. 10 is a side view for explanation of a light guide device according to the third embodiment.

As shown in FIG. 10, in the light guide device 20 of the embodiment, the first light guide member 31 is provided outside on the opposite side to the eye EY with the second light guide member 32 in between. By the arrangement, the first light guide member 31 on the light-incident side and the image forming device 10 do not interfere with the face, and the optical design becomes easier.

In the case of the embodiment, the first hologram element 42 is of reflective type and provided on the eye EY side of the light guide plate 41, and the second hologram element 43 is of reflective type and provided on the opposite side to the eye EY of the light guide plate 41.

Fourth Embodiment

As below, a virtual image display apparatus with a light guide device according to the fourth embodiment of the invention incorporated therein will be explained. Note that the light guide device according to the fourth embodiment is obtained by partially changing the light guide device according to the first embodiment and the explanation of the parts in common will be omitted.

Figure 11:
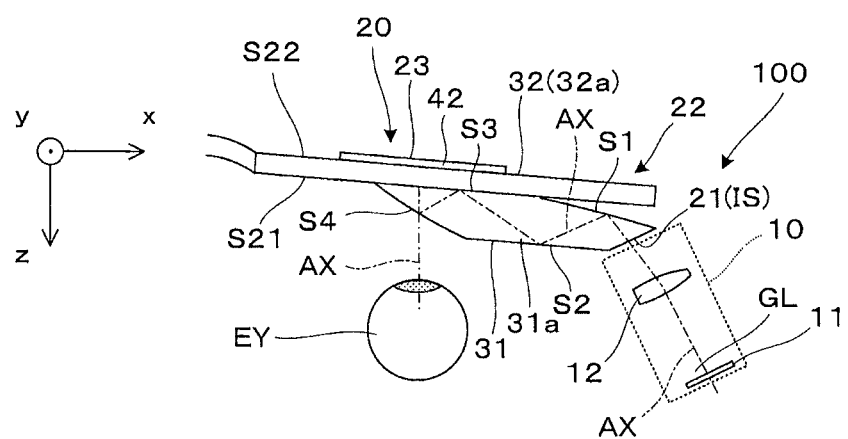
FIG. 11 is a plan sectional view for explanation of a light guide device according to the fourth embodiment.

As shown in FIG. 11, in the case of the light guide device 20 of the embodiment, the first light guide member 31 and the second light guide member 32 are provided not perpendicular, but inclined with respect to the optical axis AX on the light-exiting side or the x-axis. In this case, the first and second light guide members 31, 32 may be placed along the curve of the face and a smart appearance may be achieved, however, the normal of the second light guide member 32 has an inclination with respect to the optical axis AX and, though the details are omitted, changes are made to the characteristics of the optical surfaces and the hologram elements forming the first light guide member 31 etc.

Fifth Embodiment

As below, a virtual image display apparatus with a light guide device according to the fifth embodiment of the invention incorporated therein will be explained. Note that the light guide device according to the fifth embodiment is obtained by partially changing the light guide device according to the first embodiment and the explanation of the parts in common will be omitted.

Figure 12A:
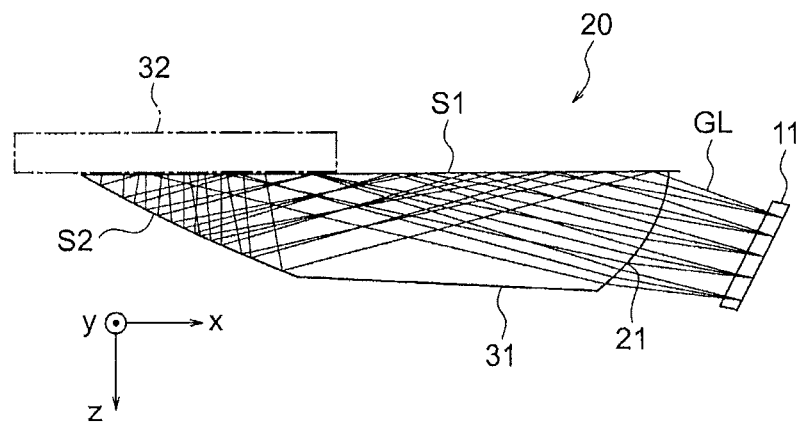
FIGS. 12A and 12B are plan sectional views of a light guide device according to the fifth embodiment.

As shown in FIG. 12A, the light guide device 20 of the embodiment is of type without the projection lens 12, not forming an intermediate image in the first light guide member 31. That is, the picture lights GL output from the respective points on the liquid crystal device 11 pass through the light-incident part 21 having positive power within the xz plane corresponding to the lateral directions, are reflected by the first surface S1 as a flat surface without power, reflected by the second surface S2 having positive power within the xz plane corresponding to the lateral directions, and thereby, collimated within the xz plane corresponding to the lateral directions into a parallel pencil of rays. The picture lights GL reflected by the second surface S2 as an inclined surface and collimated into a folded optical path pass through the first surface S1 and enter the second light guide member 32.

In the example and the subsequent examples, the surface having positive power within the xz plane generally use power with respect to the perpendicular directions, however, the explanation will be omitted later.

Figure 12B:
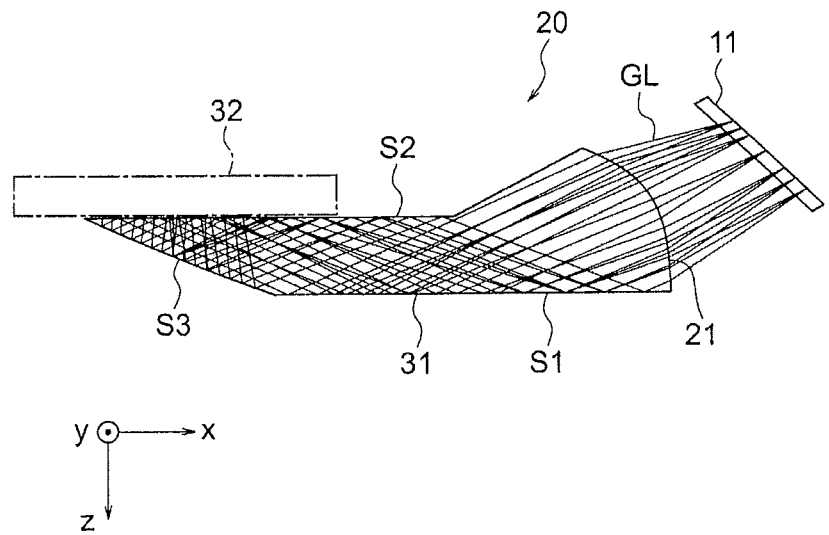

FIG. 12B shows a modified example of the embodiment shown in FIG. 12A. In this case, the picture lights GL output from the respective points on the liquid crystal device 11 pass through the light-incident part 21 having positive power within the xz plane corresponding to the lateral directions, are reflected by the first surface S1 as a flat surface without power, reflected by the second surface S2 as a flat surface without power, reflected by the third surface S3 having positive power within the xz plane corresponding to the lateral directions, and thereby, collimated within the xz plane corresponding to the lateral directions into a parallel pencil of rays. The picture lights GL reflected by the third surface S3 as an inclined surface and collimated into a folded optical path pass through the second surface S2 and enter the second light guide member 32.

Note that the light-incident part 21 of the first light guide member 31 shown in FIGS. 12A and 12B may be a Fresnel lens. Further, the second surface S2 of the first light guide member 31 shown in FIG. 12A and the third surface S3 of the first light guide member 31 shown in FIG. 12B may be Fresnel mirrors.

Sixth Embodiment

As below, a virtual image display apparatus with a light guide device according to the sixth embodiment of the invention incorporated therein will be explained. Note that the light guide device according to the sixth embodiment is obtained by partially changing the light guide device according to the first embodiment and the explanation of the parts in common will be omitted.

Figure 13A:
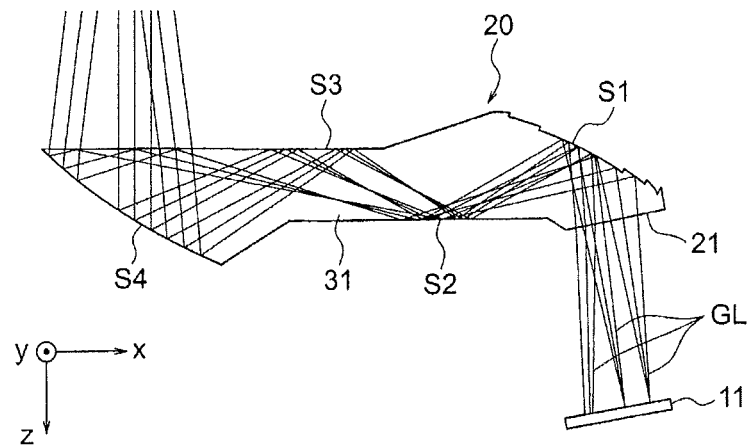
FIGS. 13A and 13B are plan sectional views of a light guide device according to the sixth embodiment.

The light guide device 20 shown in FIG. 13A is of type without the projection lens 12, forming an intermediate image in the first light guide member 31 including a prism part 131 and a mirror part. Specifically, the picture lights GL output from the respective points on the liquid crystal device 11 pass through the light-incident part 21, are sequentially reflected by the first surface S1, the second surface S2, the third surface S3, and the fourth surface S4, and thereby, collimated within the xz plane corresponding to the lateral directions into a parallel pencil of rays. The picture lights GL reflected by the fourth surface S4 and collimated pass through the third surface S3 and enter the second light guide member 32. Here, the first surface S1 is a Fresnel reflection surface, i.e., a Fresnel mirror, and the second to fourth surfaces S2 to S4 are free-form surfaces or the like.

Figure 13B:
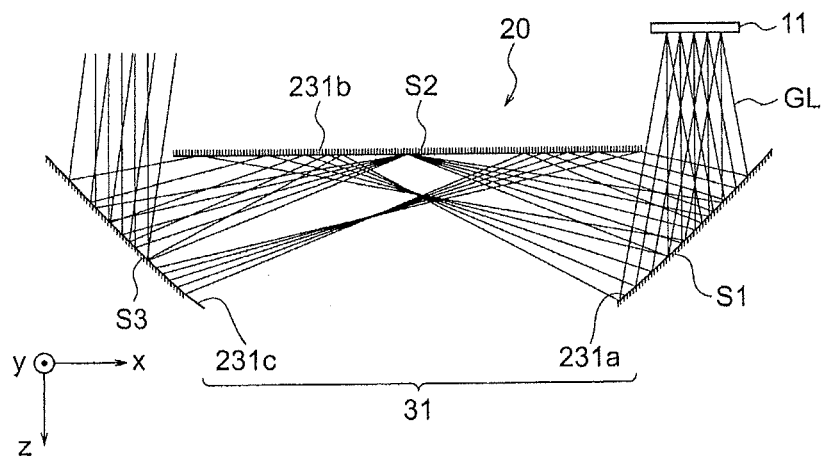

The light guide device 20 shown in FIG. 13B is of type without the projection lens 12, forming an intermediate image in the first light guide member 31 and the first light guide member 31 includes three mirrors 231a, 231b, 231c. The picture lights GL output from the respective points on the liquid crystal device 11 are reflected by the first surface S1 as the light-incident part 21 provided on the mirror 231a and once converged, reflected by the second surface S2 provided on the mirror 231b, finally reflected by the third surface S3 provided on the mirror 231c, and thereby, collimated within the xz plane corresponding to the lateral directions into a parallel pencil of rays. Here, the first surface S1 and the third surface S3 may be Fresnel mirrors having positive power.

Figure 14A:
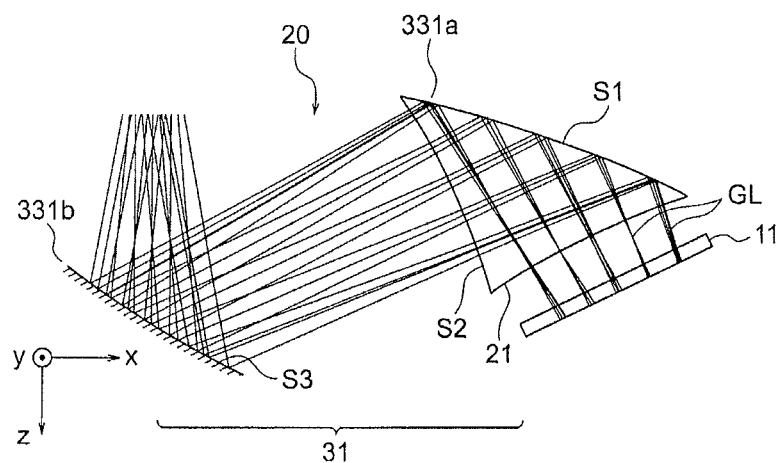
FIGS. 14A and 14B are plan sectional views of the light guide device according to the sixth embodiment.

The light guide device 20 shown in FIG. 14A is not of type forming an intermediate image in the first light guide member 31 and the first light guide member 31 includes one prism 331a and one mirror 331b. The picture lights GL output from the respective points on the liquid crystal device 11 through the light-incident part 21 enter the prism 331a, are reflected by the first surface S1, pass through the second surface S2, and thereby, are output to the outside of the prism 331a. The picture lights GL output to the outside of the prism 331a are reflected by the third surface S3 provided on the mirror 331b, and thereby, collimated within the xz plane corresponding to the lateral directions into a parallel pencil of rays. Here, the first to third surfaces S1 to S3 are free-form surfaces.

Figure 14B:
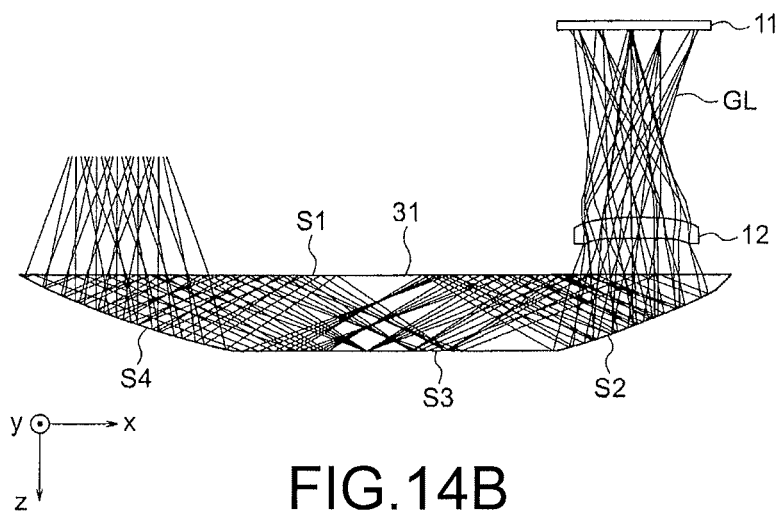

The light guide device 20 shown in FIG. 14B is of type forming an intermediate image in the first light guide member 31. The picture lights GL output from the respective points on the liquid crystal device 11 through the projection lens 12 pass through the first surface S1 as the light-incident part 21, enter the first light guide member 31, are sequentially reflected by the second surface S2, the first surface S1, the third surface S3, the first surface S1, and the fourth surface S4, and thereby, output to the outside of the first light guide member 31 through the first surface S1. Here, the first surface S1 and the third surface S3 are flat surfaces and the second surface S2 and the fourth surface S4 are free-form surfaces.

Seventh Embodiment

As below, a virtual image display apparatus with a light guide device according to the seventh embodiment of the invention incorporated therein will be explained. Note that the light guide device according to the seventh embodiment is obtained by partially changing the light guide device according to the first embodiment and the explanation of the parts in common will be omitted.

Figure 15:
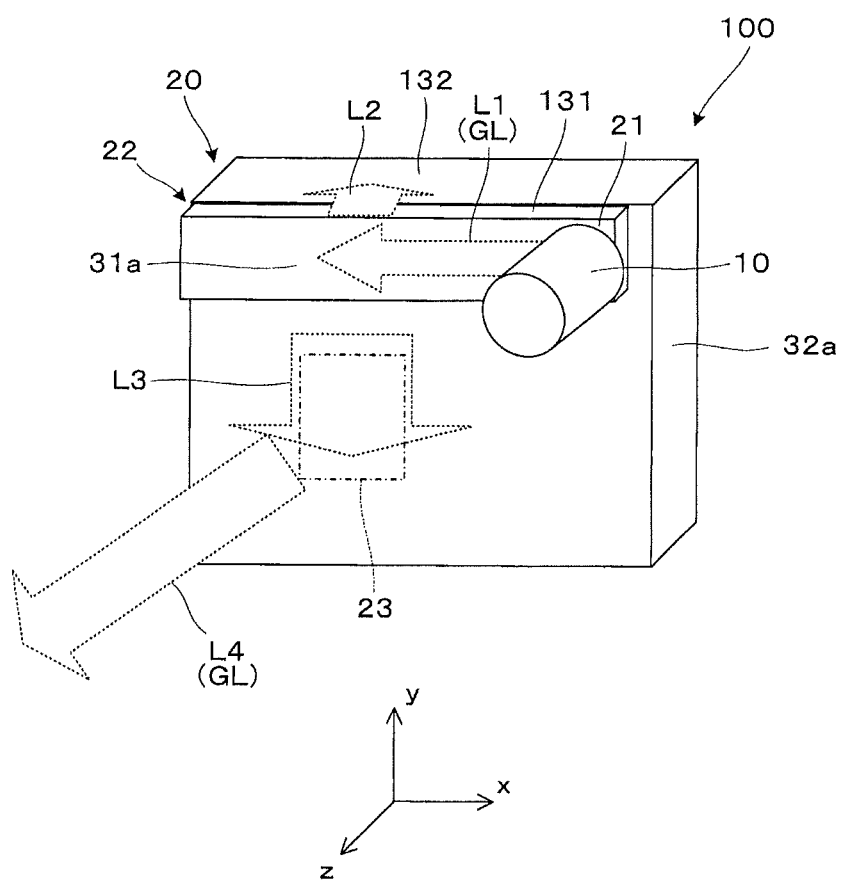
FIG. 15 is a perspective view for explanation of a light guide device according to the seventh embodiment.

As shown in FIG. 15, the light guide device 20 of the embodiment includes a first light guide member 131 and a second light guide member 132, and forms a virtual image using diffraction (specifically, holography) with respect to lateral second directions by the first light guide member 131 (including the light-incident part 21 and the first portion 31a). Further, the device forms a virtual image using a geometrical-optical non-diffraction technique (without division of beams) with respect to longitudinal first directions by the second light guide member 132 (including the second portion 32a and the light-exiting part 23).

Specifically, the picture lights GL formed by the image forming device 10 first enter the light-incident part 21, are guided to the first portion 31a of the first light guide member 131 in which a hologram element (not shown) having a diffraction action with respect to the lateral directions is incorporated, and formed into a virtual image with respect to the lateral directions (within the xz plane) as the second directions in which the eyes EY are arranged (see light L1). The directions of the picture lights GL are changed to the orthogonal forward −z direction, and the lights enter the second light guide member 132 (see light L2). The picture lights GL entering the second light guide member 132 with an optical surface or a geometrical-optical optical element having power with respect to the longitudinal directions incorporated therein are propagated in the longitudinal directions orthogonal to the arrangement of the eyes EY (specifically, −y direction) as the first directions and formed into a virtual image with respect to the longitudinal directions (see light L3). The picture lights GL reaching the light-exiting part 23 of the second light guide member 132 are output to the z side at the side of the eye EY (see light L4). In this regard, the picture lights GL shown by the light L4 form a virtual image with respect to the lateral directions and the longitudinal directions, and the observer can observe the image formed on the liquid crystal device 11.

Note that, in the light guide device 20 of the embodiment, the light-exiting part 23 is longitudinally longer in the longitudinal directions as the ±y directions, and the projection screen is longitudinally longer in the y directions. Accordingly, the virtual image is formed on the short side by the first light guide member 31 with the hologram element incorporated therein, and production of color unevenness may be suppressed.

Eighth Embodiment

As below, a virtual image display apparatus with a light guide device according to the eighth embodiment of the invention incorporated therein will be explained. Note that the light guide device according to the eighth embodiment is obtained by partially changing the light guide device according to the first embodiment and the explanation of the parts in common will be omitted.

Figure 16A:
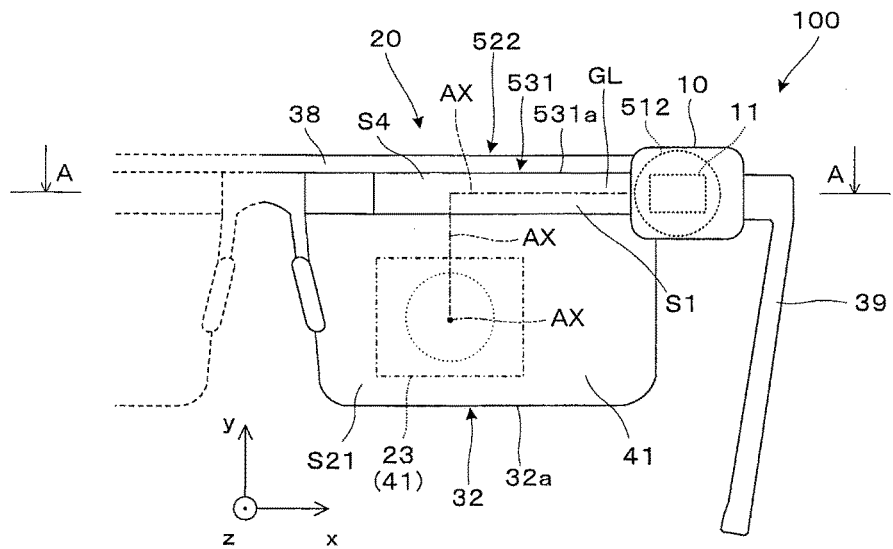
FIG. 16A is a rear view showing a virtual image display apparatus according to the eighth embodiment.
Figure 16B:
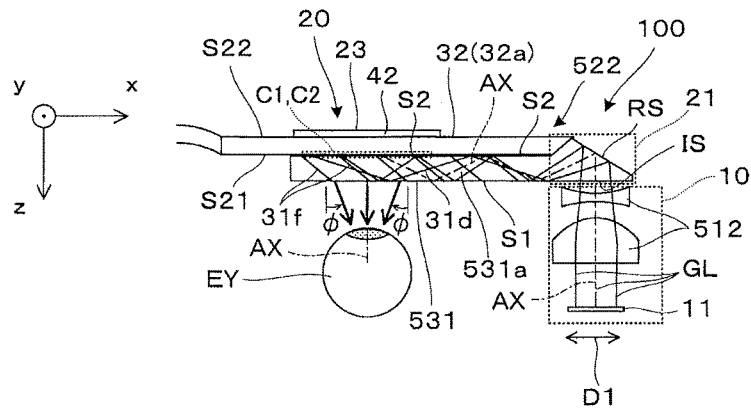
FIG. 16B is sectional view for conceptual explanation of one side of the virtual image display apparatus.
Figure 16C:
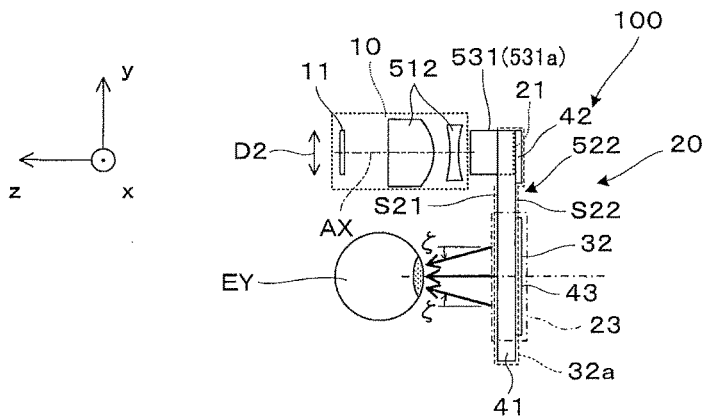
FIG. 16C is a side view for conceptual explanation of the one side of the virtual image display apparatus.

A virtual image display apparatus 100 shown in FIGS. 16A to 16C is applied to a head mounted display. In the virtual image display apparatus 100, an image forming device 10 includes a liquid crystal device 11 as a picture device and a projection lens 512 for imaging. The liquid crystal device (picture device) 11 spatially modulates illumination light from a light source (not shown) and forms picture lights GL to be displayed as a moving image or the like. The projection lens 512 is a collimator lens that parallelizes the picture lights GL output from the respective points on the liquid crystal device 11, and the picture lights GL correspond to a virtual image at infinity. Note that the projection lens 512 is formed using glass or plastic and includes not only a single lens but also a plurality of lenses. The projection lens 512 is not limited to a spherical lens, but an aspherical lens, a free-form surface lens having a non-axisymmetric surface, or the like.

In the virtual image display apparatus 100, the light guide device 20 outputs picture lights GL corresponding to a virtual image formed by the image forming device 10 toward an eye EY of the observer and transmits outside world light OL corresponding to an outside world image substantially without change. The light guide device 20 structurally includes a first light guide member 531 as an optical member that enlarges the pupil size with respect to the horizontal directions at wearing or lateral directions in which eyes EY are arranged as first directions and a second light guide member 32 as an optical member that enlarges the pupil size with respect to longitudinal directions as second directions crossing orthogonally to the first directions. In the case of the embodiment, the first light guide member (first optical member) 531 is provided in an upward position of the eye EY of the observer in a front direction of the eyebrow, and the second light guide member (second optical member) 32 is provided in a front direction of the eye EY to cover the eye EY. Here, the first light guide member 531 is provided inside at the side of the eye EY with respect to the second light guide member 32. The first light guide member 531 and the second light guide member 32 are fixed to each other or indirectly fixed via a rim part 38 or the like.

The light guide device 20 functionally includes a light-incident part 21 that takes in picture lights, a light guide part 522 for light guide and pupil enlargement, and a light-exiting part 23 for taking out picture lights. The light-incident part 21, the light guide part 522, and the light-exiting part 23 are respectively formed only by optical elements without power. The light-incident part 21 is provided in the front direction of the end of the eyebrow of the observer in the first light guide member 531, and the light-exiting part 23 is provided in the front direction of the eye EY to cover the eye EY in the second light guide member 32.

Note that the first light guide member 531 includes the light-incident part 21 and a first portion 531a, and the light-incident part 21 and the first portion 531a are partially in common. Further, the second light guide member 32 includes a second portion 32a and the light-exiting part 23, and the second portion 32a and the light-exiting part 23 are partially in common. The first portion 531a of the first light guide member 531 and the second portion 32a of the second light guide member 32 form the light guide part 522 extending between the light-incident part 21 and the light-exiting part 23. Here, the first portion 531a is provided above the eye EY and the second portion 32a is provided in front of the eye EY to cover the eye EY. Further, the first portion 531a is provided at the side of the eye EY with respect to the second portion 32a. That is, the first portion 531a on the light-incident side is inconspicuously provided behind the second portion 32a on the light-exiting side.

In the case of the above described light guide device 20, the first light guide member 531, i.e., the light-incident part 21 and the first portion 531a enlarge the pupil size by a non-diffraction or geometrical-optical technique while transferring a virtual image with respect to the lateral first directions, and thereby, contribute to virtual image formation, and the second light guide member 32, i.e., the second portion 32a and the light-exiting part 23 enlarge the pupil size using diffraction while transferring a virtual image with respect to the longitudinal second directions.

Also, in the case of the eighth embodiment, like the first embodiment, the size of a screen PW of the virtual image observed by the observer (i.e., a projection range PR) with respect to the first directions (specifically, the directions) is larger than a size of the screen PW in the second directions (specifically, the y directions) (see FIG. 2A). Thereby, though the reason will be described later, color unevenness of the screen PW may be reduced with respect to the first directions in which the size is larger and the color unevenness may be made inconspicuous as the whole screen PW. Note that, also, in the case of the eighth embodiment, like the first embodiment, the virtual image formed by the projection lens 512 may be different in imaging scaling factor between the lateral first directions in which the eyes EY are arranged and the longitudinal second directions orthogonal to the arrangement of the eyes EY (see FIGS. 2B and 2C).

Returning to FIG. 16B etc., the first light guide member 531 includes a prism part as the light-incident part 21 and a light guide rod in a rectangular column shape as the first portion 531a. The thickness of the first light guide member 531 in the anteroposterior directions (specifically, in the ±z directions) may be about 5 mm, for example, in the location of the first portion 531a.

The light-incident part 21 is an optical element with or without power and includes a light-incident surface IS as a flat surface and a reflection surface RS similarly as a flat surface. The light-incident surface IS is a surface as an extension of a first surface S1, which will be described later. The reflection surface RS is a non-transmissive mirror on which a metal film or the like is formed. The light-incident part 21 has a role of coupling the picture lights GL entering the first light guide member 531 from the image forming device 10 via the light-incident surface IS within the first portion 531a.

The first portion 531a has the first surface S1 as a flat surface with or without power and a second surface S2 as a flat surface extending in parallel to the first surface S1, and has an angle conversion part 31d that changes propagation angles of the picture lights GL. The first surface S1 and the second surface S2 are optical elements which are exposure of surfaces of the flat surfaces and total reflection surfaces that reflect the picture lights GL having predetermined or larger incident angles. That is, in the first portion 531a, a square column containing the first surface and the second surface S1, S2 is a member like a waveguide extending in the first directions (specifically, the −x direction), and propagates the picture lights GL in the first directions while multiply reflecting the picture lights GL by total reflection with respect to the xz section. In this regard, the picture lights GL are propagated while totally reflected between the first and second surfaces S1, S2 in parallel to each other, and thereby, angle information is maintained and parallel beams are propagated as parallel beams. The angle conversion part 31d has a structure in which many mirrors 31f having semi-transmissivity are arranged in parallel to one another and has a role of dividing the beams while changing the directions of the beams. Thereby, in the first portion 531a, while the picture lights GL are guided, the picture lights GL may be divided by the many mirrors 31f forming the angle conversion part 31d, and the exit width of the picture lights GL may be widened with respect to the lateral first directions and the lights are allowed to enter the second portion 32a. The many mirrors 31f forming the angle conversion part 31d are respectively tilted so that the picture lights GL may be turned toward the second portion 32a. That is, the normal of each mirror 31f is orthogonal to the y-axis and has a predetermined tilt at about 30° to 60° with respect to the x-axis and the z-axis. The angle conversion part 31d is also an optical element with or without power. The angle conversion part 31d is adapted not to substantially produce diffraction. Note that a part of the second surface S2 serves as a first coupling part C1 that outputs the picture lights GL through the first light guide member 531 or the first portion 531a, i.e., the picture lights GL in the traveling directions changed in the angle conversion part 31d toward the second light guide member 32 or the second portion 23a side.

As clearly known from the above description, the first light guide member 531 is formed only by the optical elements with or without power.

Note that the angle conversion part 31d forming the first light guide member 531 is manufactured separately from the other light-incident part 21 etc., and the parts may be integrated by joining. The angle conversion part 31d is manufactured by a method disclosed in JP-A-2013-210633 or the like, for example. The first and second surfaces S1, S2 forming the first light guide member 531 are not limited to exposure of main bodies formed using resin or glass, but may be coated main bodies with hard coating layers.

Figure 17:
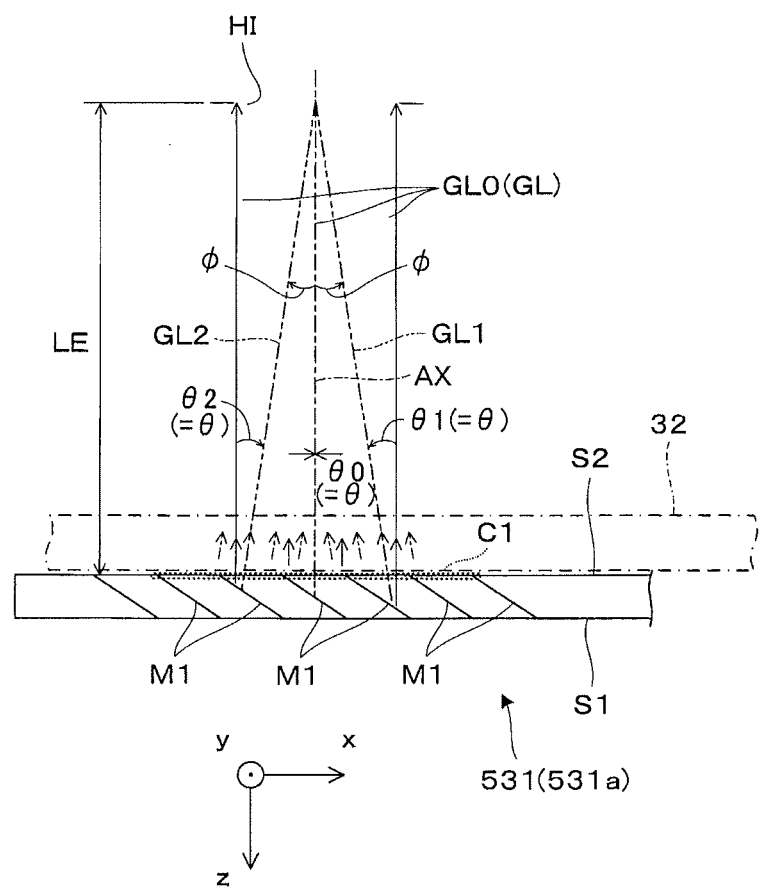
FIG. 17 is a diagram for explanation of imaging through a first light guide member or a first portion.

FIG. 17 is a diagram for explanation of the picture lights GL output from the first light guide member 531. Note that, in the drawing, for convenience of explanation, the action of the second light guide member 32 is excluded and the picture lights GL are output from the first light guide member 531 and travel straight toward the opposite side to the proper eye.

Of the picture lights GL passing through the first coupling part C1 of the first light guide member 531 and entering the second light guide member 32, the picture lights GL output from the respective points of the display area IA (see FIG. 2A) of the liquid crystal device 11 of the image forming device 10 shown in FIG. 16B are output from the first light guide member 531 in parallel beams. In this regard, within the xz plane corresponding to the lateral directions in which the eyes EY are arranged or the horizontal directions at wearing, angles θ of the picture lights GL output from the first coupling part C1 with respect to the first coupling part C1 or the second surface S2 reflect lateral directions D1 on the display area IA (see FIG. 16A). That is, a position on the display area IA in the lateral directions D1 corresponds to an incident angle φ within the xz plane with respect to the optical axis AX of the picture lights GL entering an equivalent position of the eye EY (i.e., the pupil (or eye ring) HI for observation), and the picture lights GL corresponding to a virtual image with respect to the lateral directions are output. Specifically, the picture light GL0 from the center of the liquid crystal device 11 shown in FIG. 16B is output from the first light guide member 531 (finally, the second light guide member 32) in parallel to the optical axis AX at an angle θ0=0. Further, the picture light GL1 from a position of the liquid crystal device 11 on the right side (on the +x side) in the drawing is output from the first light guide member 531 at an angle θ1 with respect to the optical axis AX. The picture light GL2 from a position of the liquid crystal device 11 on the left side (on the −x side) in the drawing is output from the first light guide member 531 at an angle θ2 with respect to the optical axis AX. In this regard, the beam width in the first directions (specifically, the ±x directions) becomes wider with the angle relationships kept by the many semi-transmissive mirrors 31f or M1. That is, the effective exit pupil width (pupil size) is wider through the first light guide member 531 and a virtual image is observed with respect to the lateral directions in which the eyes EY are arranged as the first directions. In this regard, a distance LE from the first coupling part C1 to the pupil HI is set in consideration of the standard light guide distance or the optical path length of the picture lights GL in the second light guide member 32. That is, the sufficient pupil size is secured with respect to the lateral directions, and the picture lights GL are efficiently taken in the eye EY or the pupil HI for observation.

Returning to FIGS. 16A to 16C, the second light guide member 32 is provided orthogonally to the optical axis AX on the light-exiting side or the x-axis and extends in parallel to the xy plane. Here, the optical axis AX on the light-exiting side corresponds to the front direction of the face of the observer when the virtual image display apparatus 100 or the light guide device 20 is worn, and is parallel to the axis of symmetry passing through the center of the rim part 38. The second light guide member 32 has a light guide plate 41 that forms the entire appearance, a first hologram element 42 corresponding to a diffraction optical element provided on the light-incident side of the light guide plate 41 and sending the picture lights GL to the light-existing side, and a second hologram element 43 corresponding to a diffraction optical element provided on the light-exiting side of the light guide plate 41 and sending out the picture lights GL to the eye EY side. The second light guide member 32 may be formed in a thickness of about 2 mm. These light guide plate 41, first hologram element 42, and second hologram element 43 are the same as those described in the first embodiment. Though the detailed explanation is omitted, the first hologram element 42 functions like a tilted mirror 142 within the yz plane corresponding to the longitudinal directions, and the second hologram element 43 functions like a tilted mirror 143 within the yz plane corresponding to the longitudinal directions. The light guide plate 41 has a role of widening the width of a pencil of rays, i.e., the effective exit pupil width (pupil size) with respect to the second directions, i.e., the longitudinal directions orthogonal to the lateral directions in which the eyes EY are arranged in cooperation with the second hologram element 43 while maintaining the angles of the picture lights GL in the traveling directions.

Referring to FIG. 5 used for the explanation of the first embodiment, an operation of the virtual image display apparatus 100 is conceptually explained. The picture lights GL formed by the image forming device 10 enter the light-incident part 21 in the collimated state and are guided to the first portion 531a of the first light guide member 531 having the first and second surfaces S1, S2, the angle conversion part 31d etc., and the pupil size is enlarged with respect to the lateral directions as the first directions corresponding to the arrangement of the eyes EY (see light L1). The directions of the picture lights GL are changed to the orthogonal forward −z direction, and the lights enter the second light guide member 32 (see light L2). The picture lights GL entering the second light guide member 32 having the hologram elements 42, 43 propagate in the longitudinal directions as the second directions orthogonal to the arrangement of the eyes EY (specifically, −y direction), and the pupil size is enlarged with respect to the longitudinal directions (see light L3). The picture lights GL reaching the light-exiting part 23 of the second light guide member 32 are output to the z side at the side of the eye EY (see light L4). In this regard, the picture lights GL shown by the light L4 form a virtual image having angles of view sufficient with respect to the lateral directions and the longitudinal directions, and the observer can observe the image formed on the liquid crystal device 11.

Figure 18A:
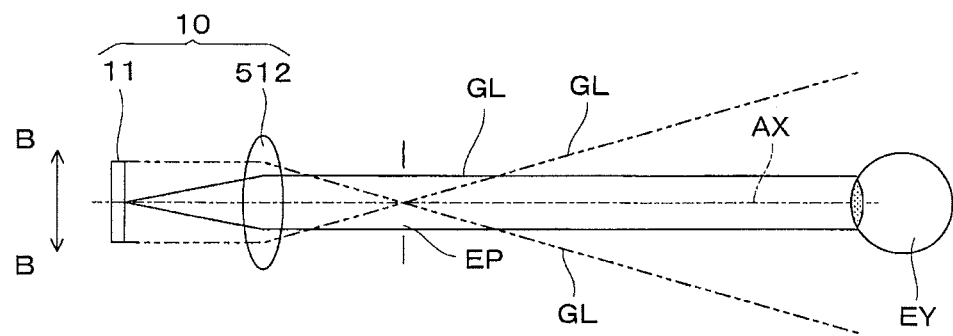
FIGS. 18A and 18B are diagrams for conceptual explanation of enlargement of a pupil size by the first light guide member etc.
Figure 18B:
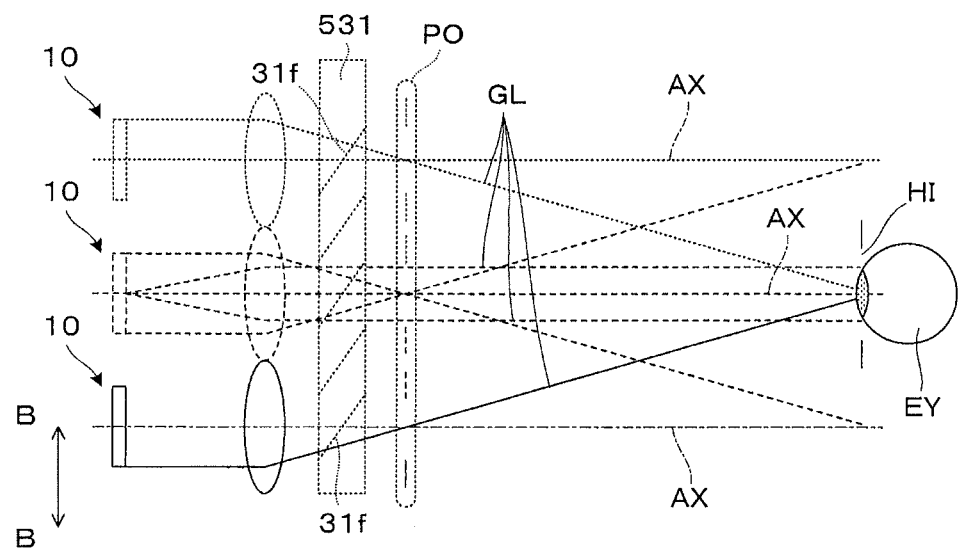

FIGS. 18A and 18B are diagrams for explanation of enlargement of the pupil size by the first light guide member 531.

FIG. 18A is a diagram for explanation of formation of a virtual image only by the image forming device 10. In the case of a telecentric configuration, the exit pupil EP exists in a back focal position of the projection lens 512. The size of the exit pupil EP is nearly equal to or smaller than the diameter of the projection lens 512, and, when the eye EY is placed apart on the back of the proper exit pupil EP, vignetting frequently occurs and only the center part of the screen is observed. Note that the above problem does not occur if the eye EY is placed in the position of the proper exit pupil EP, however, the projection lens 512 is placed closer to the eye EY and the spectacle-shaped virtual image display apparatus 100 that enables see-through vision of the outside world light OL becomes harder to be configured.

FIG. 18B is a diagram for conceptual explanation of the action of the first light guide member 531, and an effect as if many image forming devices 10 were arranged in the lateral first directions (specifically, the ±x directions) shown by arrows BB is caused. That is, the width of the pencil of rays in a position PO corresponding to the proper exit pupil EP is wider, and thereby, the size of the pupil (or eye ring) HI combined with respect to the lateral first directions BB, i.e., the effective exit pupil width (pupil size) may be made wider. As a result, even when the eye EY is placed apart on the back of the proper exit pupil EP, virtual images formed by the plurality of image forming devices 10 may be connected or superimposed, and observation of the screen without vignetting can be performed. Note that, in FIG. 18B, the three image forming devices 10 are shown, however, actually, an optical system equivalent to that of the arrangement of many image forming devices 10 superimposed in the first directions is realized.

As above, the effective enlargement of the pupil size by the first light guide member 531 is explained, however, effective enlargement of the pupil size is also performed with respect to the longitudinal second directions (specifically, the ±y directions) by the second light guide member 32, through the optical principle is different. The enlargement of the pupil size with respect to the longitudinal second directions by the second light guide member 32 is the same as that explained in the first embodiment using FIG. 5 and the explanation is omitted here.

According to the above described light guide device 20 of the eighth embodiment, not only the non-diffraction virtual image formation can be performed with respect to the lateral first directions but also the pupil size is enlarged at the virtual image formation and the pupil size is enlarged by the first and second hologram elements (diffraction optical elements) 42, 43 with respect to the longitudinal second directions, and thereby, color unevenness may be further reduced and display with higher brightness can be performed than those in the case where the pupil size is enlarged only by a diffraction optical element such as a hologram element. Note that, in the light guide device 20 of the eighth embodiment, the size including the thickness of the optical system may be suppressed to be smaller by the first and second hologram elements 42, 43 with respect to the longitudinal second directions, and the light guide device 20 may be made thinner or smaller. Further, the first and second hologram elements 42, 43 are not used with respect to the lateral first directions, and the size including the thickness of the optical system may be suppressed to be smaller by the enlargement of the pupil size though not to the extent in the longitudinal second directions.

Further, in the above described light guide device 20, by the second light guide member 32 (the second portion 32a and the light-exiting part 23), a virtual image using diffraction is formed with respect to the longitudinal second directions, that is, a virtual image using diffraction is formed on the light-exiting side, and thereby, the parts of the light guide device 20 on the light-exiting side including the light-exiting part 23 and the second portion 32a may be made thinner and a smart appearance may be easily achieved.

Ninth Embodiment

As below, a virtual image display apparatus with a light guide device according to the ninth embodiment of the invention incorporated therein will be explained. Note that the light guide device according to the ninth embodiment is obtained by partially changing the light guide device according to the eighth embodiment and the explanation of the parts in common will be omitted.

Figure 19:
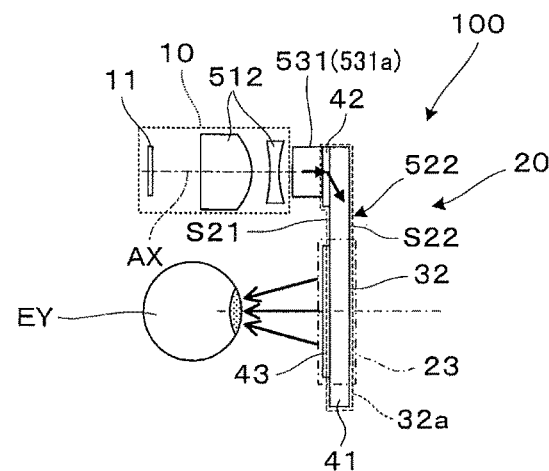
FIG. 19 is a side view for explanation of a light guide device according to the ninth embodiment.

As shown in FIG. 19, the light guide device 20 of the embodiment uses not reflective, but transmissive volume holograms as the first hologram element 42 and the second hologram element 43 in the second light guide member 32, with the first light guide member 531 as it is. In this case, the first hologram element 42 is provided between the first light guide member 531 and the light guide plate 41. The first hologram element 42 changes the traveling directions of the picture lights GL passing through the element to traveling directions at angles at which the lights are propagated while totally reflected within the light guide plate 41. The second hologram element 43 is attached onto the first surface S21 on the eye EY side of the light guide plate 41. The second hologram element 43 allows the picture lights GL propagated by total reflection within the light guide plate 41 to pass through to the outside of the light guide plate 41 and send the lights toward the eye EY.

Note that, in the above description, both the first hologram element 42 and the second hologram element 43 are of transmissive type, however, only one of the first and second hologram elements 42, 43 may be of transmissive type.

Tenth Embodiment

As below, a virtual image display apparatus with a light guide device according to the tenth embodiment of the invention incorporated therein will be explained. Note that the light guide device according to the tenth embodiment is obtained by partially changing the light guide device according to the eighth embodiment and the explanation of the parts in common will be omitted.

Figure 20:
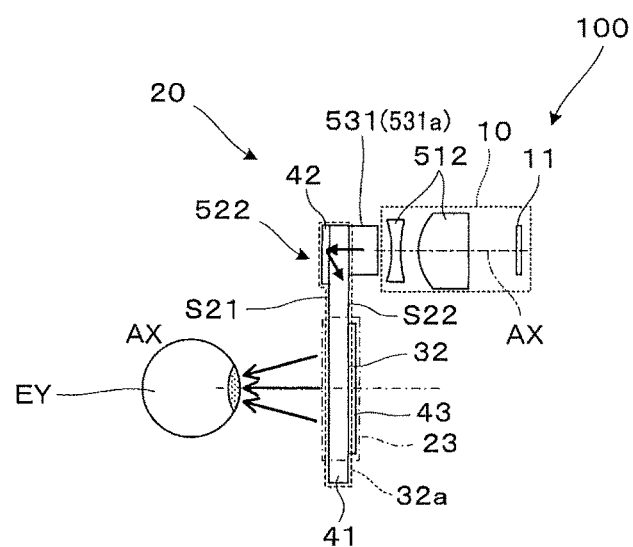
FIG. 20 is a side view for explanation of a light guide device according to the tenth embodiment.

As shown in FIG. 20, in the light guide device 20 of the embodiment, the first light guide member 531 is provided outside on the opposite side to the eye EY with the second light guide member 32 in between. By the arrangement, the first light guide member 531 on the light-incident side and the image forming device 10 do not interfere with the face, and the optical design becomes easier.

In the case of the embodiment, the first hologram element 42 is of reflective type and provided on the eye EY side of the light guide plate 41, and the second hologram element 43 is of reflective type and provided on the opposite side to the eye EY of the light guide plate 41.

Note that, in the above description, both the first hologram element 42 and the second hologram element 43 are of reflective type, however, one or both of the first and second hologram elements 42, 43 may be of transmissive type.

Eleventh Embodiment

As below, a virtual image display apparatus with a light guide device according to the eleventh embodiment of the invention incorporated therein will be explained. Note that the light guide device according to the eleventh embodiment is obtained by partially changing the light guide device according to the eighth embodiment and the explanation of the parts in common will be omitted.

Figure 21:
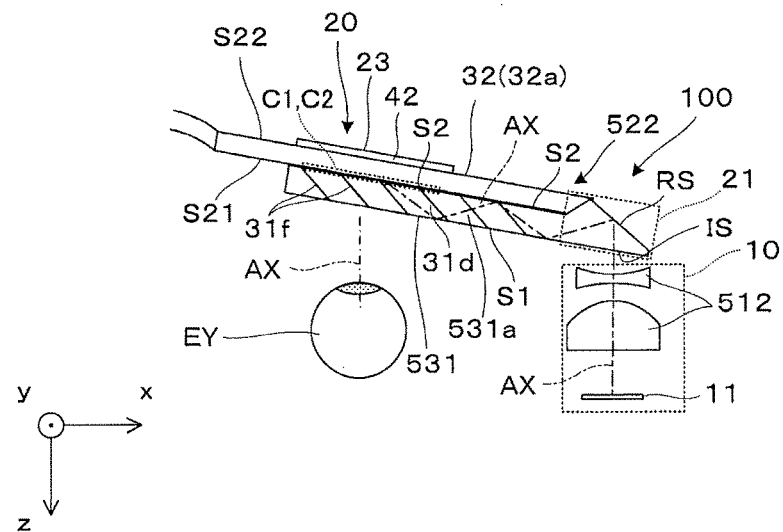
FIG. 21 is a plan sectional view for explanation of a light guide device according to the eleventh embodiment.

As shown in FIG. 21, in the case of the light guide device 20 of the embodiment, the first light guide member 531 and the second light guide member 32 are provided not perpendicular, but inclined with respect to the optical axis AX on the light-exiting side or the x-axis. In this case, the first and second light guide members 531, 32 may be placed along the curve of the face, however, the normal of the second light guide member 32 has an inclination with respect to the optical axis AX and, though the details are omitted, changes are made to the characteristics of the optical surfaces and the hologram elements forming the light-incident part 21 of the first light guide member 531.

Twelfth Embodiment

As below, a virtual image display apparatus with a light guide device according to the twelfth embodiment of the invention incorporated therein will be explained. Note that the light guide device according to the twelfth embodiment is obtained by partially changing the light guide device according to the eighth embodiment and the explanation of the parts in common will be omitted.

Figure 22:
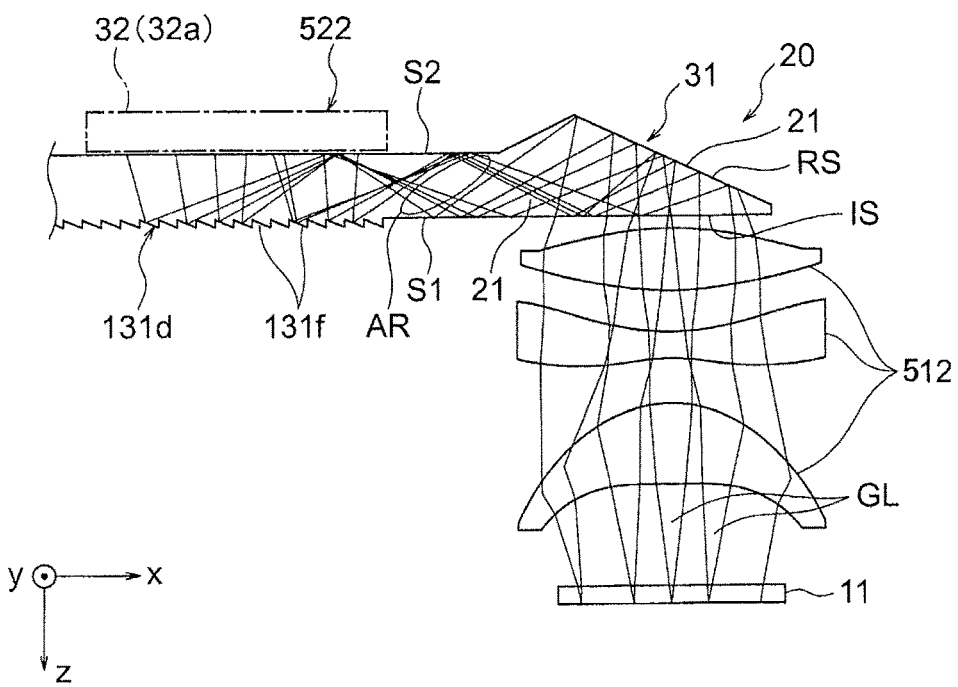
FIG. 22 is a plan sectional view for explanation of a light guide device according to the twelfth embodiment.

The light guide device 20 shown in FIG. 22 uses a Fresnel mirror as an angle conversion part 131$d$ of the first light guide member 531. The angle conversion part (Fresnel mirror) 131$d$ is formed by arrangement of many micro mirrors 131$f$ in the ±x directions, and the respective micro mirrors 131$f$ are tilted like the mirrors 31$f$ in the angle conversion part 31$d$ of the first embodiment. These micro mirrors 131$f$ are respectively tilted so that the picture lights GL may be directed toward the second light guide member 32 or the second portion 32$a$. That is, the angle conversion part (Fresnel mirror) 131$d$ has no power. Consequently, the beam width of the picture lights GL in the first directions (specifically, the ±x directions) becomes wider with the angle relationships of the picture lights GL kept by the many micro mirrors 131$f$. Here, the micro mirrors 131$f$ are arranged in a pattern of 100 μm or more to prevent diffraction.

In the case of the embodiment, the image forming device 10 has a non-telecentric configuration and the pencil of rays is once narrowed in the area AR within the first light guide member 531, and the pencil of rays is wider near the angle conversion part 131$d$. Thereby, while the angle conversion part 131$d$ is provided apart from the image forming device 10, the number of reflections of the respective beams by the surfaces S1, S2 to the angle conversion part 131$d$ may be made equal, and thereby, control of brightness of the screen is easier.

Note that the micro mirrors 131$f$ are non-transmissive mirrors on which metal films or the like are formed on the surfaces thereof, however, semi-transmissive mirrors may be employed.

In the light-incident part 21 of the first light guide member 531, an angle conversion part of a Fresnel mirror may be used in place of the reflection surface RS of the first embodiment.

Thirteenth Embodiment

As below, a virtual image display apparatus with a light guide device according to the thirteenth embodiment of the invention incorporated therein will be explained. Note that the light guide device according to the thirteenth embodiment is obtained by partially changing the light guide device according to the eighth embodiment and the explanation of the parts in common will be omitted.

Figure 23:
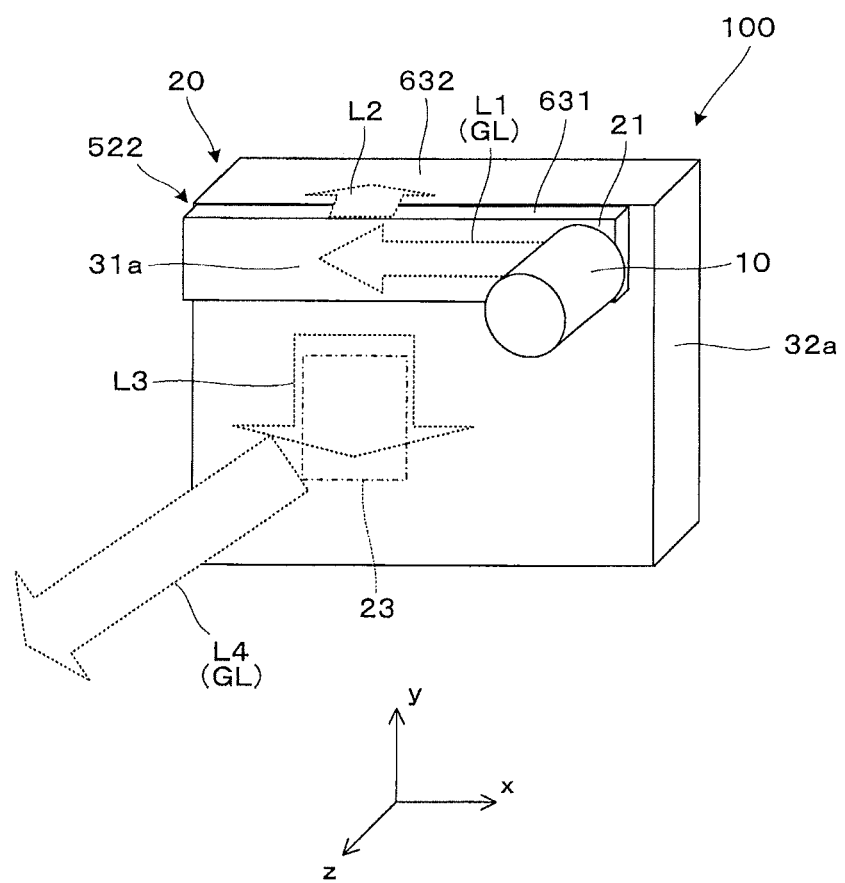
FIG. 23 is a perspective view for explanation of a light guide device according to the thirteenth embodiment.

As shown in FIG. 23, the light guide device 20 of the embodiment includes a first light guide member 631 and a second light guide member 632, and performs enlargement of the pupil size using diffraction (specifically, holography) with respect to lateral second directions by the first light guide member 631 (including the light-incident part 21 and the first portion 31a). Further, the device performs enlargement of the pupil size using a geometrical-optical non-diffraction technique (with division of beams) with respect to longitudinal first directions by the second light guide member 632 (including the second portion 32a and the light-exiting part 23).

Specifically, the picture lights GL formed by the image forming device 10 first enter the light-incident part 21 and are guided to the first portion 31a of the first light guide member 631 in which a hologram element (not shown) having a diffraction action with respect to the lateral directions incorporated therein, and the pupil size is enlarged while a virtual image is maintained with respect to the lateral directions (within the xz plane) as the second directions in which the eyes EY are arranged (see light L1). The directions of the picture lights GL are changed to the orthogonal forward −z direction, and the lights enter the second light guide member 632 (see light L2). The picture lights GL entering the second light guide member 632 with many geometrical-optical optical elements such as transmissive mirrors or Fresnel mirrors for light division with respect to the longitudinal directions incorporated therein are propagated in the longitudinal directions orthogonal to the arrangement of the eyes EY (specifically, −y direction) as the first directions and the pupil size is enlarged while the virtual image is maintained with respect to the longitudinal directions (see light L3). The picture lights GL reaching the light-exiting part 23 of the second light guide member 632 are output to the z side at the side of the eye EY (see light L4). In this regard, the picture lights GL shown by the light L4 form a virtual image having an effectively widened pupil size with respect to the lateral directions and the longitudinal directions, and the observer can observe the image formed on the liquid crystal device 11.

Note that, in the light guide device 20 of the embodiment, the light-exiting part 23 is longitudinally longer in the longitudinal directions as the ±y directions, and the projection screen is longitudinally longer in the y directions. Accordingly, the virtual image is formed on the short side by the first light guide member 631 with the hologram element incorporated therein, and production of color unevenness may be suppressed.

Other Examples

As above, the invention is explained according to the respective embodiments, however, the invention is not limited to the above described embodiments and can be embodied in various forms without departing the scope of the invention. For example, the following modifications can be made.

As the diffraction optical element, not only the hologram element but also a diffraction element may be used. In the case where a color image is formed, as described in U.S. Pat. No. 8,965,152, channels for respective colors may be provided within a waveguide.

In the above description, the transmissive liquid crystal device 11 is used as the picture device, however, various devices including, but not limited to, the transmissive liquid crystal device may be used as the picture device. For example, a configuration using a reflective liquid crystal panel can be employed, and a digital micromirror device or the like may be used in place of the liquid crystal device 11. Or, a configuration using a self-emitting device represented by an organic EL, an LED array, or an organic LED can be employed. Or, a configuration using a laser scanner in which a laser source and a scanner including a polygon mirror are combined can be employed.

In the above description, a pair of the image forming device 10 and the light guide device 20 are provided for each of the right eye and the left eye as the virtual image display apparatus 100, however, the image forming device 10 and the light guide device 20 may be provided for only one of the right eye and the left eye for monocular vision.

In the above description, the specific explanation is made with the virtual image display apparatus 100 of the embodiments as the head mounted display, however, the virtual image display apparatus 100 of the embodiments may be applied to a head-up display, a binocular hand-held display, or the like.

In the above description, the image forming device 10 is formed to be located outside in the lateral directions of the eyes, however, the placement of the image forming device 10 and the light guide device 20 shown in FIG. 1A may be rotated about the axis of the eye EY (i.e., the optical axis AX extending in the z directions) to 90°. That is, the image forming device 10 may be placed in the upward direction of the eye and the light guide device 20 may be longitudinally elongated and placed in front of the eye EY.

Though not described in the above description, of the outer peripheral parts defining the outer shapes of the first light guide members 31, 131, 531, 631, the upper end surfaces, the lower end surfaces, etc. may be black paint coated surfaces or sandblasted surfaces. Further, black paint coating or sandblasting may be applied to other locations than the upper end surfaces and the lower end surfaces.

The entire disclosure of Japanese Patent Application Nos. 2015-170160, filed Aug. 31, 2015 and 2015-170161, filed Aug. 31, 2015 are expressly incorporated by reference herein.

What is claimed is:

1. A light guide device comprising:
   A first light guide member having a light-incident part into which picture lights enter;
   a light guide part that guides the picture lights via the light-incident part; and
   a light-exiting part that outputs the picture lights from the light guide part to a position of an eye,
   wherein the light-incident part, light guide part and light-exiting part are configured to perform light guiding that contributes to non-diffraction virtual image formation is performed with respect to first directions along a predetermined surface covering a front of the eye, and a pupil size is enlarged by a diffraction optical element with respect to second directions crossing the first directions along the predetermined surface, and
   wherein the first light guide member includes a first surface having positive power or refractive power within a plane corresponding to lateral directions, a second surface as a flat surface without power, a third surface as a flat surface without power, and a fourth surface as an inclined surface having positive power within the plane corresponding to the lateral directions, and wherein the first and fourth surfaces are curved to be concave or convex with respect to the first directions and having power with respect to the first directions.

2. The light guide device according to claim 1, wherein the light guide part has a first portion on the light-incident part side and a second portion on the light-exiting part side, and
   a virtual image is geometrically and optically formed with respect to the first directions by the light-incident part and the first portion, and a virtual image using diffraction is formed with respect to the second directions by the second portion and the light-exiting part.

3. The light guide device according to claim 2, wherein the first portion is formed by an optical member having power at least with respect to the first directions, and an intermediate image is formed inside.

4. The light guide device according to claim 2, wherein the first portion is formed by an optical member without power with respect to the second directions.

5. The light guide device according to claim 2, wherein the first portion outputs the picture lights to the second portion by reflection by an inclined surface with respect to the first directions.

6. The light guide device according to claim 2, wherein the second portion and the light-exiting part are second light guide members in which a plurality of the diffraction optical elements are incorporated.

7. The light guide device according to claim 6, wherein the second light guide member has a light guide plate, a first hologram element corresponding to the diffraction optical element provided on a light-incident side of the light guide plate and sending the picture lights into a light-exiting side, and a second hologram element corresponding to the diffraction optical element provided on the light-exiting side of the light guide plate and sending out the picture lights to the eye side.

8. The light guide device according to claim 1, wherein the light guide part has a first portion on the light-incident part side and a second portion on the light-exiting part side, and
a virtual image using diffraction is formed with respect to the second directions by the light-incident part and the first portion, and a virtual image is geometrically and optically formed with respect to the first directions by the second portion and the light-exiting part.

9. The light guide device according to claim 1, wherein the pupil size is enlarged with respect to the first directions.

10. The light guide device according to claim 9, wherein the light-incident part, the light guide part, and the light-exiting part are formed by optical elements without effective power.

11. The light guide device according to claim 10, wherein collimated picture lights are allowed to enter the light-incident part.

12. The light guide device according to claim 9, wherein the light guide part has a first portion on the light-incident part side and a second portion on the light-exiting part side, and
the pupil size is geometrically and optically enlarged with respect to the first directions by the light-incident part and the first portion, and the pupil size is enlarged using diffraction with respect to the second directions by the second portion and the light-exiting part.

13. The light guide device according to claim 12, wherein the first portion is a waveguide-like member extending in the first directions and has a plurality of mirrors parallel to one another and tilted to direct the picture lights toward the second portion.

14. The light guide device according to claim 12, wherein the second portion and the light-exiting part are light guide members in which a plurality of the diffraction optical elements are incorporated.

15. The light guide device according to claim 14, wherein the light guide member has a light guide plate, a first hologram element corresponding to the diffraction optical element provided on a light-incident side of the light guide plate and sending the picture lights to a light-exiting side, and a second hologram element corresponding to the diffraction optical element provided on the light-exiting side of the light guide plate and sending the picture lights to the eye side.

16. The light guide device according to claim 9, wherein the light guide part has a first portion on the light-incident part side and a second portion on the light-exiting part side, and
the pupil size is enlarged using diffraction with respect to the second directions by the light-incident part and the first portion, and the pupil size is geometrically and optically enlarged with respect to the first directions by the second portion and the light-exiting part.

17. The light guide device according to claim 2, wherein the second portion is provided to cover the eye and the first portion is provided on a side of the eye with respect to the second portion.

18. The light guide device according to claim 2, wherein the second portion is provided to cover the eye and the first portion is provided on an opposite side to the eye with the second portion in between.

19. The light guide device according to claim 2, wherein the first portion is provided above the eye and the second portion is provided in front of the eye.

20. The light guide device according to claim 1, wherein a size of a screen of a virtual image with respect to the first directions is larger than a size with respect to the second directions.

21. The light guide device according to claim 1, wherein the first directions correspond to horizontal directions at wearing.

22. The light guide device according to claim 1, wherein an optical system of the light-exiting part is provided nearly orthogonally to an optical axis on a light-exiting side.

23. The light guide device according to claim 1, wherein an optical system of the light-exiting part is provided to be inclined with respect to an optical axis on a light-exiting side.

24. The light guide device according to claim 1, wherein the diffraction optical element is a reflective hologram element or a transmissive hologram element.

25. A display apparatus comprising:
a picture device that generates picture lights; and
the light guide device according to claim 1.

* * * * *